United States Patent
Ueda et al.

(10) Patent No.: US 10,017,616 B2
(45) Date of Patent: Jul. 10, 2018

(54) POLYOLEFIN-BASED RESIN WRAP FILM AND WRAP FILM-ENCASING BODY

(71) Applicant: ASAHI KASEI KABUSHIKI KAISHA, Tokyo (JP)

(72) Inventors: Aritaka Ueda, Tokyo (JP); Yoshihiro Asada, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 62 days.

(21) Appl. No.: 15/103,061

(22) PCT Filed: Dec. 15, 2014

(86) PCT No.: PCT/JP2014/083166
§ 371 (c)(1),
(2) Date: Jun. 9, 2016

(87) PCT Pub. No.: WO2015/093448
PCT Pub. Date: Jun. 25, 2015

(65) Prior Publication Data
US 2016/0355647 A1   Dec. 8, 2016

(30) Foreign Application Priority Data
Dec. 16, 2013 (JP) .................. 2013-259453

(51) Int. Cl.
*C08J 5/18* (2006.01)
*B65D 83/08* (2006.01)
*B26F 3/02* (2006.01)
*B65D 65/02* (2006.01)
*B65H 35/00* (2006.01)
*B29K 23/00* (2006.01)
*B29C 55/28* (2006.01)

(52) U.S. Cl.
CPC ............ *C08J 5/18* (2013.01); *B26F 3/02* (2013.01); *B65D 65/02* (2013.01); *B65D 83/0847* (2013.01); *B65D 83/0882* (2013.01); *B65H 35/002* (2013.01); *B29C 55/28* (2013.01); *B29K 2023/00* (2013.01); *C08J 2323/08* (2013.01); *C08J 2323/20* (2013.01); *C08J 2423/06* (2013.01); *C08J 2423/08* (2013.01); *C08J 2423/12* (2013.01)

(58) Field of Classification Search
CPC ...... C08J 5/18; C08J 2323/08; C08J 2323/20; B32B 27/32; B29D 7/01; B65H 35/002; B29C 47/0054; B29C 47/0057; B29C 55/005; B29C 55/28; B29C 55/30; B65D 83/08; B65D 83/0882; B29K 2023/04; B29K 2023/06
See application file for complete search history.

(56) References Cited

U.S. PATENT DOCUMENTS

| | | | |
|---|---|---|---|
| 5,326,627 A | 7/1994 | Yazaki et al. | |
| 5,492,767 A | 2/1996 | Yazaki et al. | |
| 6,479,137 B1 | 11/2002 | Joyner et al. | |
| 6,482,532 B1 | 11/2002 | Yap et al. | |
| 2003/0138584 A1* | 7/2003 | Kobayashi | B32B 27/32 428/40.1 |
| 2004/0067382 A1 | 4/2004 | Niepelt | |
| 2011/0252745 A1* | 10/2011 | Breck | B32B 27/08 53/451 |

FOREIGN PATENT DOCUMENTS

| | | |
|---|---|---|
| EP | 1 279 494 | 1/2003 |
| JP | 52-043880 | 4/1977 |
| JP | 06-143516 | 5/1994 |
| JP | 2001-246708 | 9/2001 |
| JP | 2004-216825 | 8/2004 |
| JP | 3838978 | 10/2006 |
| JP | 2008-031380 | 2/2008 |
| JP | 2011-168750 | 9/2011 |
| JP | 2012-071891 | 4/2012 |
| JP | 2013-199295 | 10/2013 |
| JP | 2013-245014 | 12/2013 |

OTHER PUBLICATIONS

International Search Report issued in PCT/JP2014/083166, dated Mar. 24, 2015, with English language translation.
IPRP issued in PCT/JP2014/083166, dated Jun. 21, 2016, with English language translation.
Search Report issued in European Patent Office (EPO) Patent Application No. 14872297.8, dated Oct. 31, 2016.

* cited by examiner

*Primary Examiner* — Roberto Rabago
(74) *Attorney, Agent, or Firm* — Greenblum & Bernstein, P.L.C.

(57) ABSTRACT

There is provided a polyolefin-based resin wrap film which contains a polyolefin-based resin, wherein the wrap film is torn in the machine direction when being torn in the machine direction; the wrap film is torn in the transverse direction when being torn in the transverse direction; the wrap film is torn either in the machine direction or in the transverse direction when being torn in a direction at 45° to the machine direction; an acute angle formed by a tearing direction and a cut line when the wrap film is torn in a direction at 45° to the machine direction is 30 to 60°; and a tear strength when the wrap film is torn in a direction at 45° to the machine direction is 10 g or lower.

20 Claims, 6 Drawing Sheets

POLYOLEFIN-BASED RESIN WRAP FILM AND WRAP FILM-ENCASING BODY

TECHNICAL FIELD

The present invention relates to a polyolefin-based resin wrap film and a wrap film-encasing body.

BACKGROUND ART

Food wrap films are used mainly in usual homes as simple packing materials for foods, and many thereof are used for the purpose of protecting food. When food or a container is packed in such a wrap film, there is needed such adhesiveness that the film is adhered with the container or with itself and does not spontaneously peel therefrom. The wrap films are further required to have heat resistance endurable to their usage in microwave ovens, exhibit rigid touch feeling, be tense, have suitable packed article appearance and be sanitary. Further since such wrap films are encased mostly as rolls in encasing boxes, a low drawing-out force from the encasing boxes, a low cutting force and a stable propagation character when the films are cut are simultaneously required. Moreover, it is also important that good-quality inexpensive wrap films can be efficiently produced and provided.

Particularly wrap films containing vinylidene chloride-based resin, since having a high close-adhesive force and a good cutting property in use of a blade, are broadly used mainly as household food packing materials (for example, see Patent Document 1). Additionally, there are also used wrap films containing a polyolefin-based resin, which is a chlorine-free resin.

CITATION LIST

Patent Document

Patent Document 1: Japanese Patent Laid-Open No. 2011-168750

SUMMARY

Technical Problem

Conventional wrap films are inferior in the cutting property in the case of being cut by hand, and are difficult to cut by hand. Further, it is more difficult to cut it in good straightness by hand. Hence, a blade to cut a wrap film is provided on an encasing container. When a blade to cut a wrap is provided, however, there arises a risk of cutting the hand in use of the wrap, and particularly in the case where a child uses the wrap, caution is required. Moreover since the blade has a different material from that of the encasing container, there arises a problem on their separation and disposal.

Further, among conventional wrap films containing a polyolefin-based resin, wrap films containing a polyethylene-based resin, shrink, for example, when used in microwave ovens, and the attachment of hot oil to the wrap films then causes the wrap films to be pierced with holes in some cases. Hence, the wrap films containing a polyethylene-based resin are inferior in hot oil resistance.

Further, even conventional wrap films containing a polymethylpentene and wrap films containing a polyolefin-based resin have also such problems that these are, when being cut by hand, difficult to cut in a straight line in the TD direction or MD direction, and need a force for cutting because of a high tear strength to make the cutting difficult.

The present invention has been achieved in consideration of the above problems, and has an object to provide a polyolefin-based resin wrap film capable of being easily cut in a predetermined direction by hand and excellent in hot oil resistance, and a wrap film-encasing body encasing the wrap film.

Solution to Problem

As a result of exhaustive studies on the above problems, the present inventors have found that a wrap film containing a predetermined polyolefin resin can solve the above problems; and this finding has led to the completion of the present invention.

That is, the present invention is as follows.

[1]

A polyolefin-based resin wrap film comprising a polyolefin-based resin, wherein the wrap film is torn in a machine direction when being torn in the machine direction;

the wrap film is torn in a transverse direction when being torn in the transverse direction;

the wrap film is torn either in the machine direction or in the transverse direction when being torn in a direction at 45° to the machine direction;

an acute angle formed by a tearing direction and a cut line when the wrap film is torn in a direction at 45° to the machine direction is 30 to 60°; and the wrap film has a tear strength of 10 g or lower when the wrap film is torn in a direction at 45° to the machine direction.

[2]

The polyolefin-based resin wrap film according to the above-described [1], wherein an elastic modulus thereof in the machine direction is 300 MPa or higher;

a puncture strength thereof is 260 g or lower; and a machine-direction shrinkage factor (Smd) thereof determined by the following formula (1) and a transverse-direction shrinkage factor (Std) thereof determined by the following formula (2) satisfy Smd≥2.5 times, Std≥2.5 times, Smd×Std≥10 times and Std/Smd=0.5 to 10:

$$\text{machine-direction shrinkage factor } (Smd) = 100/(100-\alpha md) \quad (1); \text{ and}$$

$$\text{transverse-direction shrinkage factor } (Std) = 100/(100-\alpha td) \quad (2),$$

wherein in the above formulae (1) and (2), αmd represents a maximum thermal shrinkage (%) in the machine direction; and αtd represents a maximum thermal shrinkage (%) in the transverse direction.

[3]

The polyolefin-based resin wrap film according to the above-described [1] or [2], wherein the polyolefin-based resin comprises a polyethylene-based resin.

[4]

The polyolefin-based resin wrap film according to any one of the above-described [1] to [3], wherein in an azimuth distribution profile of a scattering intensity at a scattering angle of 2θ=20.9° to 21.8° when an X-ray beam of 0.154 nm in wavelength is allowed to be incident on the film from a film normal direction and transmission wide-angle X-ray scattering is measured, the azimuth distribution profile has four scattering peaks;

adjacent scattering peak intervals of the four scattering peaks are 90°±10°;

an oriented component ratio R is 0.01 or higher and 100 or lower; and an average area of the four scattering peaks is 1 or larger and 89 or smaller.

[5]

The polyolefin-based resin wrap film according to any one of the above-described [1] to [4], wherein a melting point thereof in differential scanning calorimetry is 80 to 123° C.

[6]

The polyolefin-based resin wrap film according to any one of the above-described [1] to [5], wherein a gel fraction thereof is 10 to 60% by mass.

[7]

The polyolefin-based resin wrap film according to any one of the above-described [1] to [6], wherein a heat-resistive temperature thereof is 130° C. or higher.

[8]

A roll obtained by winding a polyolefin-based resin wrap film according to any one of the above-described [1] to [7].

[9]

A wrap film-encasing body, having a roll obtained by winding a polyethylene-based resin wrap film according to the above-described [8], and a container encasing the roll, wherein the container has a cutting tool to cut the polyethylene-based resin wrap film.

[10]

The wrap film-encasing body according to the above-described [8], wherein the cutting tool is a projection-like tool provided on a part of the container.

[11]

A wrap film-encasing body, having a roll obtained by winding a polyethylene-based resin wrap film according to the above-described [8], and a container encasing the roll, wherein the container has no cutting tool to cut the polyethylene-based resin wrap film.

Advantageous Effects of Invention

The present invention can provide a polyolefin-based resin wrap film capable of being easily cut in a predetermined direction by hand and excellent in hot oil resistance, and a wrap film-encasing body encasing the wrap film.

DESCRIPTION OF EMBODIMENTS

Figure 1:
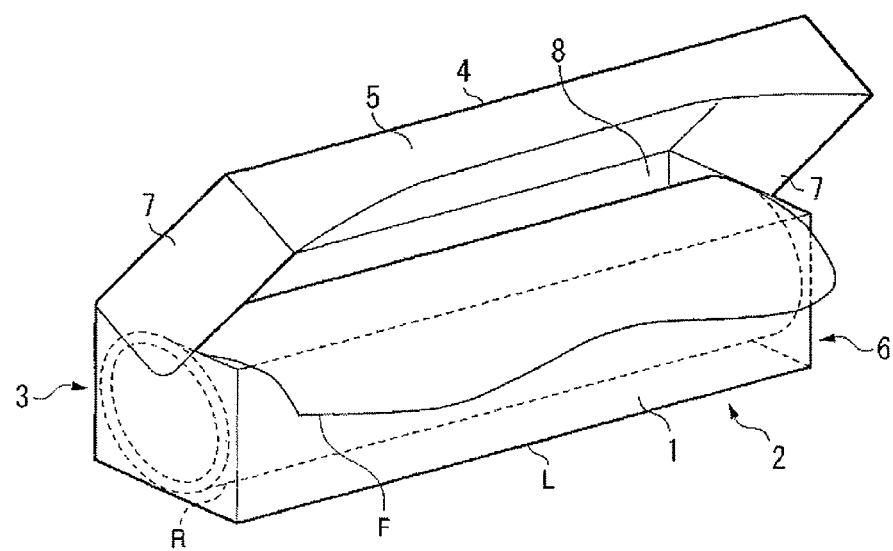
FIG. 1 shows a perspective view illustrating one example of a wrap film-encasing body encasing a polyolefin-based resin wrap film according to the present embodiment.

Hereinafter, an embodiment to carry out the present invention (hereinafter, referred to as "present embodiment") will be described in detail, but the present invention is not limited thereto and various changes and modifications may be made without departing from its gist.

[Polyolefin-Based Resin Wrap Film]

A polyolefin-based resin wrap film according to the present embodiment (hereinafter, referred to also as "wrap film") comprises a polyolefin-based resin, wherein the wrap film is torn in the machine direction (hereinafter, referred to also as "MD direction") when being torn in the machine direction;

the wrap film is torn in the transverse direction (hereinafter, referred to also as "TD direction") when being torn in the transverse direction;

the wrap film is torn either in the machine direction or in the transverse direction when being torn in a direction at 45° to the machine direction;

an acute angle formed by a tearing direction and a cut line when the wrap film is torn in a direction at 45° to the machine direction is 30 to 60°; and a tear strength when being torn in a direction at 45° to the machine direction is 10 g or lower.

Wrap films refer mainly to ones to be used by being cut by hand as simple packing materials for food mainly in usual homes and eating places. In wrap film applications, if a wrap film can be easily cut straight in a predetermined direction by hand, a blade of an encasing container becomes unnecessary and the wrap film can be used safely even when being used by a child or the like. Further if the blade becomes unnecessary, not only the production cost of the encasing container can be reduced but also the disposal cost can be reduced. However, such a problem does not become an especial problem in applications for business use using shrink-packing films and the like, in which the films are cut by using an apparatus or the like and food is packed therein. The wrap films may be used, other than in the above applications to food packing, in the following applications: an application where a wrap film is wound round one's head for the purpose of prevention of a dyeing solution from being transferred to other places and suppression of volatilization of the dyeing solution to enhance the dyeing effect, in hair dyeing in beauty parlors and the like; an application where a wrap film is wound on chaps and wounds of skins for the purpose of moisture retention and prevention of volatilization of an ointment; an application where a wrap film is wound on irritations of muscles and joints after exercises for the purpose of contacting and fixing ice, a cold insulator or the like on the irritations for reduction of the irritation, so-called cool-down; an application where a wrap film is wound round one's stomach for the purpose of raising the heat insulation of the stomach in exercises and enhancement of the dieting effect; an application where a wrap film is wound round thighs, knees and the like for the purpose of raising the heat insulation of these parts and prevention of injuries in exercises; and the like.

[Polyolefin-Based Resin]

The polyolefin-based resin is not especially limited, but examples thereof include homopolymers of olefins such as polyethylene, polypropylene, polybutene and poly-4-methylpentene, copolymers of two or more olefins, and copolymers of one or more olefins with dissimilar components excluding the olefins. The polyolefin-based resins may be used singly or concurrently in two or more.

(Polyethylene-Based Resin)

The polyolefin-based resin preferably contains a polyethylene-based resin among the polyolefin-based resins. The polyethylene-based resin refers to a polyolefin resin containing an ethylene unit. Such a polyethylene-based resin is not especially limited, but examples thereof include polyethylene; ethylene-vinyl acetate copolymers; ethylene-aliphatic unsaturated carboxylic acid copolymers such as ethylene-acrylic acid copolymers and ethylene-methacrylic acid copolymers; and ethylene-aliphatic unsaturated carboxylate ester copolymers such as ethylene-methyl acrylate copolymers, ethylene-methyl methacrylate copolymers, ethylene-ethyl acrylate copolymers, ethylene-ethyl methacrylate copolymers, ethylene-butyl acrylate copolymers and ethylene-butyl methacrylate copolymers. When the polyolefin-based resin contains the polyethylene-based resin, the wrap film is likely to be better in the stretchability in wrap film production, the electron beam crosslinkability, the strength at low temperatures, and the like. The polyethylene-based resin may be used singly or concurrently in two or more.

The content of the polyethylene-based resin is, based on 100% by mass of the polyolefin-based resin, preferably 70 to 100% by mass, more preferably 80 to 100% by mass, and still more preferably 90 to 100% by mass. When the content of the polyethylene-based resin is in the above range, the wrap film is likely to be better in the stretchability in wrap film production, the electron beam crosslinkability, the film strength at low temperatures, and the like.

Among the polyethylene-based resins, preferable are very low density polyethylene, high pressure processed low density polyethylene, linear low density polyethylene, medium density polyethylene, low pressure processed high density polyethylene, ethylene-vinyl acetate copolymers, and the like; and from the viewpoint of the puncture resistance, more preferable are high pressure processed low density polyethylene, linear low density polyethylene, ethylene-vinyl acetate copolymers, and the like.

The very low density polyethylene (hereinafter, referred to also as "VLDPE") refers to a polyethylene-based resin having a density of lower than 0.910 $g/cm^3$. The content of the VLDPE is, based on 100% by mass of the polyolefin-based resin, preferably 0 to 80% by mass, more preferably 0 to 60% by mass, and still more preferably 0 to 40% by mass.

The low density polyethylene (hereinafter, referred to also as "LDPE") refers to a polyethylene-based resin having a density of 0.910 $g/cm^3$ or higher and lower than 0.930 $g/cm^3$. The LDPE may be one in which ethylene is not simply linearly bonded and which has many long chain branches (LCB) and short chain branches (SCB). The content of the LDPE is, based on 100% by mass of the polyolefin-based resin, preferably 5 to 50% by mass, more preferably 8 to 40% by mass, and still more preferably 10 to 30% by mass. When the content of the LDPE is in the above range, the elasticity (tension and rigidity) and the adhesiveness of the wrap film are likely to be more raised.

A method for producing the low density polyethylene is not especially limited, but for example, a commonly well-known method, for example, a high pressure process can be used. In the high pressure process, specifically, low density polyethylene can be produced by polymerizing ethylene at a high temperature and a high pressure of 100 to 300° C. and 100 to 350 MPa in the presence of a free radical generator such as a peroxide in an autoclave, tube reactor or the like.

The linear low density polyethylene (hereinafter, referred to also as "LLDPE") is one kind of very low density polyethylene and low density polyethylene, referred to also as an ethylene-α-olefin copolymer, and is generally a copolymer of ethylene with one or more α-olefins.

The α-olefin is not especially limited, but examples thereof include at least one selected from α-olefins having 3 to 20 carbon atoms, such as 1-butene, 1-pentene, 1-hexene, 4-methyl-1-pentene and 1-octene. Among these, preferable are 1-butene, 1-hexene and 1-octene. Further the content of the α-olefin in the linear low density polyethylene is preferably 6 to 30% by mass in terms of charging monomer.

The content of the LLDPE is, based on 100% by mass of the polyolefin-based resin, preferably 50 to 95% by mass, more preferably 55 to 90% by mass, and still more preferably 60 to 85% by mass.

The density of the LLDPE is preferably 0.900 to 0.940 $g/cm^3$, more preferably 0.910 to 0.935 $g/cm^3$, and still more preferably 0.920 to 0.930 $g/cm^3$. When the density is 0.900 $g/cm^3$ or higher, it is likely that the excessive adhesiveness is suppressed; the drawing-out force is more raised; and the elasticity (tension and rigidity) of the film is more raised. Further when the density is 0.940 $g/cm^3$ or lower, the adhesiveness of the wrap film is likely to be more raised.

A method for producing the linear low density polyethylene is not especially limited, but examples thereof include commonly known methods such as a gas-phase fluidized bed method, a gas-phase agitated bed method, a liquid-phase slurry method, a liquid-phase solution method and a high-pressure reaction vessel method. Specific examples thereof include a method in which ethylene and an α-olefin are copolymerized in a gas phase or liquid phase at a low temperature and low pressure in the presence of a transition metal catalyst. The catalyst is not especially limited, but examples thereof include Ziegler catalysts, Phillips catalysts and metallocene catalysts. Among these, Ziegler catalysts are preferable. Use of a Ziegler catalyst is likely to make low-molecular weight components in obtained polyethylene to become much and moderately raise the adhesiveness.

The medium density polyethylene (hereinafter, referred to also as "MDPE") refers to a polyethylene-based resin having a density of 0.930 $g/cm^3$ or higher and lower than 0.942 $g/cm^3$. The content of the MDPE is, based on 100% by mass of the polyolefin-based resin, preferably 0 to 80% by mass, more preferably 0 to 60% by mass, and still more preferably 0 to 40% by mass.

The high density polyethylene (hereinafter, referred to also as "HDPE") refers to a polyethylene-based resin having a density of 0.942 $g/cm^3$ or higher. The HDPE is generally a polyethylene-based resin having linearly bonded ethylene with almost no branches. The content of the HDPE is, based on 100% by mass of the polyolefin-based resin, preferably 0 to 30% by mass, more preferably 0 to 20% by mass, and still more preferably 0 to 9% by mass. When the content of the HDPE is in the above range, it is likely that the elasticity (tension and rigidity) of the wrap film is more raised and the wrap film becomes easy to stretch in production thereof.

The high density polyethylene is an ethylene homopolymer or a copolymer of ethylene with α-olefins, and can be produced by a known method such as a Phillips process, a Standard process or a Ziegler process.

The measurement of the density of polyethylene can be carried out by a method described in Examples. The very low density polyethylene, high-pressure processed low density polyethylene, medium density polyethylene, low-pressure processed high density polyethylene and linear low density polyethylene may be used singly or concurrently in two or more thereof which have used different catalysts and have different constituting components.

The ethylene-vinyl acetate copolymer (hereinafter, referred to also as "EVA") is preferably one in which the content of a vinyl acetate component therein is preferably 5 to 25% by mass based on 100% by mass of the ethylene-vinyl acetate copolymer. When the vinyl acetate component is 5% by mass or more, the adhesiveness of the wrap film is likely to be more raised. Further when the vinyl acetate component is 25% by mass or less, the odor of the wrap film is likely to become nearly odorless. The content of the EVA is, based on 100% by mass of the polyolefin-based resin, preferably 0 to 30% by mass, more preferably 0 to 20% by mass, and still more preferably 0 to 10% by mass.

It is preferable that the polyolefin-based resin contains 5 to 50% by mass of the LDPE, 50 to 95% by mass of the LLDPE and 0 to 30% by mass of the EVA; it is more preferable to contain 8 to 40% by mass of the LDPE, 55 to 90% by mass of the LLDPE and 0 to 20% by mass of the EVA; and it is still more preferable to contain 10 to 30% by mass of the LDPE, 60 to 85% by mass of the LLDPE and 0 to 10% by mass of the EVA. When the polyolefin-based resin has the above composition, it is likely that the elasticity (tension and rigidity), the adhesiveness and the film production stability of the wrap film are better.

The polyolefin-based resin can be polymerized by using a known catalyst such as a single-site catalyst or a multi-site catalyst. The polyolefin-based resin is not limited to one obtained from conventional raw materials originated from petroleum and natural gas, but may be one obtained from raw materials originated from plants such as sugarcane and corn.

The density of the polyolefin-based resin is preferably 0.860 to 0.960 g/cm$^3$, more preferably 0.900 to 0.955 g/cm$^3$, and still more preferably 0.915 to 0.950 g/cm$^3$. When the density is in the above range, the elasticity (tension and rigidity), the strength and the adhesiveness of the film and the stability of the film production are likely to be better. Here, the density can be measured by a method described in Examples.

The melt flow rate (hereinafter, referred to also as "MFR") at 190° C. and 2.16 kg of the polyolefin-based resin is preferably 0.1 to 25 g/10 min, more preferably 0.2 to 10 g/10 min, and still more preferably 0.3 to 5 g/10 min. When the MFR is 0.1 g/10 min or higher, it is likely that the molecular chain entanglement becomes moderately weak and a force required for cutting thereof becomes smaller, and foreign matter such as decomposed substances in an extrusion step of the resin is less frequently generated. Further when the MFR is 25 g/10 min or lower, it is likely that since the molecular chain entanglement becomes moderately much and the polyolefin-based resin is easily oriented, the wrap film is likely to be suppressed in careless breakage. Here, the MFR can be measured by a method described in Examples.

The wrap film may be one composed of a single layer or a lamination layer containing the polyolefin-based resin, or may be one composed of a layer containing the polyolefin-based resin and a laminated body containing layers containing other resins.

In the case of the laminated body, when the ethylene-vinyl acetate copolymer is used as its surface layer, the adhesiveness of the wrap film is raised. In each layer of the wrap film, there may be blended other resins and various types of additives in the range of less than 50% by weight.

[Other Additives]

The wrap film may contain, as required, known additives used for food packing materials, such as plasticizers, stabilizers, weather resistance improving agents, colorants such as dye or pigment, antifogging agents, antibacterial agents, lubricants and nucleating agents. These each may be used singly or concurrently in two or more.

The plasticizer is not especially limited, but examples thereof include citrate esters such as tributyl acetylcitrate, dimethyl phthalate, diethyl phthalate, dioctyl phthalate, glycerol, glycerol ester, wax, liquid paraffin, phosphate ester and epoxidized soybean oil.

The stabilizers are not especially limited, but specifically includes antioxidants such as 2,5-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3', 5'-di-t-butyl-4'-hydroxyphenyl) propionate and 4,4'-thiobis-(6-t-butylphenol); and thermal stabilizers such as epoxidized vegetable oil, laurate salts, myristate salts, palmitate salts, stearate salts, isostearate salts, oleate salts, ricinoleate salts, 2-ethyl-hexanoate salts, isodecanoate salts, neodecanoate salts and calcium benzoate.

The weather resistance improving agent is not especially limited, but specifically includes ultraviolet absorbents such as ethylene-2-cyano-3,3'-diphenyl acrylate, 2-(2'-hydroxy-5'-methylphenyl)benzotriazole, 2-(2'-hydroxy-3'-t-butyl-5'-methylphenyl)5-chlorobenzotriazol, 2-hydroxy-4-methoxybenzophenone and 2,2'-dihydroxy-4-methoxybenzophenone.

The colorant such as dye or pigment is not especially limited, but specifically includes carbon black, phthalocyanine, quinacridone, indoline, azo pigment and rouge.

The antifogging agent is not especially limited, but specifically includes glycerol fatty acid esters, sorbitan fatty acid esters, polyoxyethylene fatty acid alcohol ethers, polyoxyethylene glycerol fatty acid esters and polyoxyethylene sorbitan fatty acid esters. Among these, there is preferable the addition of glycerol fatty acid esters originated from fatty acids containing no double bond, such as glycerol stearate, diglycerol stearate, glycerol laurate and diglycerol laurate. The bleeding of the additive components on the film surface is thereby suppressed and the fogging of the film surface can be suppressed.

The antibacterial agent is not especially limited, but specifically includes silver-based inorganic antibacterial agents.

The lubricant is not especially limited, but specifically includes ethylenebisstearamide, butyl stearate, polyethylene wax, paraffin wax, carnauba wax, fatty acid hydrocarbon-based lubricants such as myristyl myristate and stearyl stearate, higher fatty acid lubricants, fatty acid amide-based lubricants and fatty acid ester lubricants.

The nucleating agent is not especially limited, but specifically includes phosphate ester metal salts.

[Evaluation of Tear in a Direction at 45° to the Machine Direction]

In the evaluation of tear in a direction at 45° to the machine direction, as in the tear test B method (Elmendorf method) of JIS K7128, a tear test is carried out; and there is measured an acute angle formed by a tearing direction and a cut direction, that is, made by a tearing direction and a cut line when a wrap film is torn in a direction at 45° to the machine direction. Here, a test piece is sampled in a direction at 45° to the machine direction from the wrap film, and the test piece size is set to 60×60 mm and the slit length is set to 10 mm.

The acute angle formed by a tearing direction and a cut line when a wrap film is torn in a direction at 45° to the machine direction is 30 to 60°, preferably 35 to 55°, and more preferably 40 to 50°. When the angle formed by the tearing direction and the cut line is the above range, the cut line is likely to be better in the cutting straightness when a wrap film is cut by hand. Here, the "cut line" refers to a line connecting a tear starting point and a tear end point (an intersection of an end side of the wrap film test piece and an actually torn line) when the wrap film is torn in a line direction drawn in a direction at 45° to the MD direction. Even in the case where the wrap film is torn in a direction at 45° to the MD direction thereof, the wrap film according to the present embodiment is torn in the MD direction or in the TD direction. Hence, the tearing direction in the case where the acute angle formed by the tearing direction and the cut line is 45° when the wrap film is torn in a direction at 45° to the MD direction thereof becomes the MD direction or the TD direction. The angle formed by the tearing direction and the cut line can be controlled by the stretching conditions, and the degree of the orientation caused thereby. In the biaxial stretching, the higher the stretch ratio and the lower the stretching temperature, the higher the degree of the orientation of the molecules and the more strongly the molecular chains are oriented in the MD and TD directions. Hence, when the wrap film is torn, the wrap film is easily torn in the directions in which the molecules are oriented strongly. That is, it becomes easy for the wrap film to be torn in the MD and TD directions; and it becomes uneasy to be torn in other directions, for example, in a direction at 45° to the MD direction. Therefore, even if the wrap film is torn at 45° to the machine direction, the wrap film is torn in the MD direction or in the TD direction. In the case where a roll of such a wrap film is drawn out and cut by hand, when a starting point is made by fingers while a tension is applied in the machine direction, the wrap film is enabled to be easily cut in the transverse direction.

[Evaluation of Tear in the Machine Direction]

The evaluation of tear in the machine direction can be carried out as in the evaluation of tear in a direction at 45° to the machine direction, except for that the tearing direction is the machine direction. The acute angle formed by the tearing direction and the cut line when the wrap film is torn in the machine direction is 0 to 15°, preferably 0 to 10°, and more preferably 0 to 5°. When the angle formed by the tearing direction and the cut line is in the above range, the cut line is likely to be better in the cutting straightness when the wrap film is cut by hand. In the present embodiment, "being torn in the machine direction when being torn in the machine direction" refers to that the angle formed by the tearing direction and the cut line is in the above range.

[Evaluation of Tear in the Transverse Direction]

The evaluation of tear in the transverse direction can be carried out as in the evaluation of tear in a direction at 45° to the machine direction, except for that the tearing direction is the transverse direction. The acute angle formed by the tearing direction and the cut line when the wrap film is torn in the transverse direction is 0 to 15°, preferably 0 to 10°, and more preferably 0 to 5°. When the angle formed by the tearing direction and the cut line is in the above range, the cut line is likely to be better in the cutting straightness when the wrap film is cut by hand. In the present embodiment, "being torn in the transverse direction when being torn in the transverse direction" refers to that the angle formed by the tearing direction and the cut line is in the above range.

[Tear Strength]

The tear strength of the wrap film when being torn in a direction at 45° to the MD direction is 10 g or lower, preferably 1 to 8 g, and more preferably 2 to 6 g. When the tear strength in a direction at 45° to the MD direction is in the above range, the wrap film is likely to be better in the cutting property in the MD direction and the TD direction. Here, when the tear strength is higher than 10 g, the wrap film cannot easily be cut by hand. The tear strength of the wrap film when being torn in a direction at 45° to the MD direction refers to a tear strength measured in the tearing.

The tear strength of the wrap film when being torn in the MD direction is preferably 10 g or lower, more preferably 1 to 8 g, and still more preferably 2 to 6 g. When the tear strength in the MD direction is in the above range, the wrap film is likely to be better in the cutting property in the MD direction. Here, when the tear strength is higher than 10 g, the wrap film cannot easily be cut by hand.

The tear strength of the wrap film when being torn in the TD direction is preferably 10 g or lower, more preferably 1 to 8 g, and still more preferably 2 to 6 g. When the tear strength in the TD direction is in the above range, the wrap film is likely to be better in the cutting property in the TD direction. Here, when the tear strength is higher than 10 g, the wrap film cannot easily be cut by hand.

Here, the tear strength in the each direction can be measured by a method described in Examples. The tear strength of the wrap film can be controlled by the stretch ratio, the content ratio of each resin, the density of the resin, the thickness and the like.

[Transmission Wide-Angle X-Ray Scattering Measurement]

In an azimuth distribution profile of the scattering intensity at a scattering angle of $2\theta=20.9°$ to $21.8°$ when an X-ray beam of 0.154 nm in wavelength is allowed to be incident on a film from the film normal direction and the transmission wide-angle X-ray scattering is measured, it is preferable that the azimuth distribution profile has four scattering peaks; the adjacent scattering peak intervals of the four scattering peaks are $90°\pm10°$; the oriented component ratio R is 0.01 or higher and 100 or lower; and the average area of the four scattering peaks is 1 or larger and 89 or smaller. Here, the "film normal direction" refers to a direction passing through one point of the film and being normal to the tangent plane at the point.

The transmission wide-angle X-ray scattering measurement of the wrap film is carried out by the following method. An X-ray beam of 0.154 nm in wavelength is allowed to be incident on the wrap film in the film normal direction and the transmission wide-angle X-ray scattering is measured. At this time, a two-dimensional detector is used. In the measurement, an air scattering correction is made. A scattering intensity profile is then acquired with respect to the azimuth $\varphi$ in the range of a scattering angle $(2\theta)=20.9°$ to $21.8°$. At this time, the scattering intensity is normalized by the following formula (3).

$$I'(\phi)=I(\phi)\times 360/\int_0^{360} I(\phi)d\phi \quad (3)$$

wherein $I(\varphi)$ is an actually measured scattering intensity, and $I'(\varphi)$ is a normalized scattering intensity.

It is preferable that the azimuth distribution profile has four scattering peaks. The intervals of the four scattering peaks are preferably $90°\pm10°$, more preferably $90°\pm8°$, and still more preferably $90°\pm5°$.

The four scattering peaks are designated as A, B, C and D in order from the smaller side of azimuths thereof, and scattering peak areas thereof are designated as SA, SB, SC and SD. Here, in the case where a scattering peak partially emerges at an azimuth of nearly 0°, the sum of areas of scattering peaks partially emerging nearly at 0° and nearly at 359° is taken as SA. At this time, an area S of each scattering peak is defined by the following formula (4).

$$S=\int_{\phi 1}^{\phi 2} I'(\phi)d\phi \quad (4)$$

wherein φ1 and φ2 are integration upper and lower limits (φ1<φ2), which use φs at which I'(φ) interposing each scattering peak take minimum values.

Further the oriented component ratio R is defined by the following formula (5). The oriented component ratio R is preferably 0.01 or higher and 100 or lower, more preferably 0.05 or higher and 50 or lower, and still more preferably 0.1 or higher and 10 or lower.

$$R=(SA+SC)/(SB+SD) \tag{5}$$

Further the average area S' of the four scattering peaks is defined by the formula (6). The average area S' is preferably 1 or larger and 89 or smaller, more preferably 10 or larger and 79 or smaller, and still more preferably 20 or larger and 69 or smaller.

$$S'=(SA+SB+SC+SD)/4 \tag{6}$$

Since the wrap film satisfying the above four conditions is oriented in two orthogonal directions (generally in the MD direction and in the TD direction), even if cutting (tearing) is attempted from any direction, the wrap film is enabled to be cut preferentially and in good straightness in the two orthogonal directions.

[Melting Point of the Wrap Film]

The melting point in differential scanning calorimetry (DSC) of the wrap film is preferably 80° C. to 123° C., more preferably 85° C. to 122° C., and still more preferably 90° C. to 121° C. Here, in the case where there are a plurality of peaks in the measurement of DSC of the wrap film, a highest value thereof is taken as a melting point peak. In the case where the wrap film contains a high-melting point HDPE, a specific MDPE and the like, the melting point is higher than 123° C. in some cases. When the melting point is in the above range, it is likely that the puncture resistance (puncture depth per unit thickness) of the wrap film is more raised and it becomes difficult for the wrap film to be torn by projections.

[Crosslinking Treatment; Gel Fraction]

The wrap film is preferably one having been subjected to a crosslinking treatment by an energy ray irradiation. When the wrap film is a crosslinked one, the wrap film can be cut more easily by hand. Further when the wrap film is a crosslinked one, the wrap film is likely to be more improved in the heat resistance and oil resistance usable in a high-temperature condition in microwave ovens.

The gel fraction of the wrap film is used as an index of the degree of crosslinking. The gel fraction of the wrap film is preferably 10 to 60% by mass, more preferably 15 to 50% by mass, and still more preferably 25 to 40% by mass. When the gel fraction is in the above range, it is likely that there are more improved the cutting property by hand, the heat resistance, the oil resistance, and the stretchability in the production. Here, the gel fraction can be measured by a method described in Examples.

[Elastic Modulus]

The elastic modulus of the wrap film in the present embodiment is used as an index of the difficulty in elongation of the film, the drawing-out property and the cutting property. The elastic modulus in the MD direction is preferably 300 MPa or higher, more preferably 300 to 1,200 MPa, and still more preferably 300 to 900 MPa. Further the elastic modulus in the TD direction is preferably 100 MPa or higher, more preferably 100 to 1,000 MPa, and still more preferably 100 to 800 MPa. When the elastic modulus in the MD direction or the elastic modulus in the TD direction is in the above range, it is likely that the drawing-out property of the wrap film is more improved; the wrap film is difficult in being elongated when being cut; and the cutting property becomes better.

Here, the elastic modulus can be measured by a method described in Examples. Further the elastic modulus can be regulated by regulation of the density, the degree of crosslinking, the stretch ratio and the like of the resin to be used.

[Puncture Strength]

The puncture strength of the wrap film is preferably 260 g or lower, more preferably 50 to 250 g, and still more preferably 100 to 240 g. Here, the puncture strength can be measured by a method described in Examples. Further the puncture strength can be regulated by regulation of the density, the degree of crosslinking, the stretch ratio and the like of the resin.

When the elastic moduli in the MD direction and the TD direction are in the above ranges and the puncture strength is in the above range, since the wrap film becomes difficult in being elongated in the MD direction and in the TD direction and easily forms a penetration mark to become a starting point of cutting the wrap film by a projection or the like, the cutting property is likely to be more improved and excellent.

[Shrinkage Factor]

The shrinkage factor of the wrap film in the present embodiment is a pseudo-stretch ratio reversely calculated from a maximum thermal shrinkage, and is used as an index of the degree of orientation. The maximum thermal shrinkage in the present embodiment refers to a thermal shrinkage in which a stretched wrap film is heated, so that the residual stress is released and shrinking is started, and thereafter the residual stress disappears and the thermal shrinkage is reached at the time point of the completion of the shrinking behavior. That is, the maximum thermal shrinkage refers to a thermal shrinkage measured when the wrap film is heated, in the case of a crystalline resin, at a temperature at which the crystal is considered to have been completely melted, and in the case of an amorphous resin, at a temperature fully exceeding its glass transition temperature Tg. The heating temperature employed for the measurement is a higher one in the following.

(A) A crystal-melting completion temperature in DSC method+10° C.

(B) Tg in DSC method+30° C.

The machine-direction shrinkage factor (Smd) determined by the following formula (1) is preferably 2.5 or higher, more preferably 3.0 or higher, and still more preferably 4.0 or higher. When the Smd is in the above range, since the wrap film is highly oriented in the MD direction, it is likely that the film can easily be ruptured straight in the MD direction and the cutting property is more improved.

$$\text{Machine-direction shrinkage factor }(Smd)=100/(100-\alpha md) \tag{1}$$

wherein αmd represents a maximum thermal shrinkage (%) in the machine direction.

The transverse-direction shrinkage factor (Std) determined by the following formula (2) is preferably 2.5 or higher, more preferably 3.0 or higher, and still more preferably 4.0 or higher. When the Std is in the above range, since the wrap film is highly oriented in the TD direction, it is likely that the film can easily be ruptured straight in the TD direction and the cutting property is more improved.

$$\text{Transverse-direction shrinkage factor }(Std)=100/(100-\alpha td) \tag{2}$$

wherein αtd represents a maximum thermal shrinkage (%) in the transverse direction.

Here, the machine-direction shrinkage factor (Smd) and the transverse-direction shrinkage factor (Std) can be calculated by a method described in Examples. The shrinkage factors can be regulated to desired values by regulation of the degree of crosslinking, the stretch ratio, the stretching temperature, the heat set condition, and the like.

The areal stretch ratio (Smd×Std) is preferably 10 or higher, more preferably 15 or higher, and still more preferably 20 or higher. When the areal stretch ratio (Smd×Std) is in the above range, since the polyolefin-based resin is highly oriented in the MD direction and in the TD direction, it is likely that the wrap film can easily be ruptured straight in the MD direction or in the TD direction from the starting point of cutting of the film.

Std/Smd is preferably 0.5 to 10, more preferably 0.52 to 9, and still more preferably 0.55 to 8. When the Std/Smd is in the above range, the cutting property in the transverse direction is likely to be better. Thereby, when a wrap film roll is handled, the trouble that tearing continues in the longitudinal direction in error is thereby likely to occur less frequently.

[Heat-Resistive Temperature]

The heat-resistive temperature of the wrap film is preferably 130° C. or higher, more preferably 135° C. or higher, and still more preferably 140° C. or higher. When the heat-resistive temperature is in the above range, it is likely that for example, when the wrap film is used in microwave ovens, boring of holes due to attachment of high-temperature oil on the wrap film can be suppressed more. The heat-resistive temperature can be regulated by regulation of the kind, the density, the degree of crosslinking and the like of the resin. Here, the heat-resistive temperature can be measured by a method described in Examples.

[Adhesion Workload]

The adhesion workload of the wrap film is preferably 0.50 to 3.50 mJ, more preferably 0.80 to 3.00 mJ, and still more preferably 1.00 to 2.00 mJ. When the adhesion workload is 0.50 mJ or higher, the adhesiveness is high and it is likely that the spontaneous peeling-off of the wrap film can be suppressed. Further when the adhesion workload is 3.50 mJ or lower, it is likely that the excessive close-adhesion is prevented and the handleability is more improved. The adhesion workload is an index for evaluating the adhesiveness of the film with itself and with a container when the wrap film is covered on the container and food, and is an important characteristic in addition to the drawing-out force.

Here, the adhesion workload can be measured by a method described in Examples. The adhesion workload can be regulated by regulation of the density and the combination of the resins to be used.

[Thickness]

The thickness of the wrap film is preferably 5.0 to 15.0 μm, more preferably 5.0 to 12.0 μm, and still more preferably 5.0 to 8.5 μm. When the total-layer thickness is 5 μm or larger, it is likely that becoming easily ruptured can be more suppressed. Further when the total-layer thickness is 15 μm or smaller, the cutting property is likely to be more improved.

Here, the thickness can be measured by a method described in Examples. The total-layer thickness can be regulated by regulation of the discharge amounts or the ratios of respective layers from extruders, the line velocity, the stretch ratio and the like in the production.

[Method for Producing a Wrap Film Roll]

A method for producing a wrap film according to the present embodiment is not especially limited as long as being a commonly known method, but examples thereof include a method comprising an extrusion step, a stretching (film formation) step, a winding-up step, and the like; and as required, there may be carried out processes such as a lamination step, an energy ray irradiation step and a heat set step.

The extrusion step is a step of melt extruding a polyolefin resin from an extruder. In the case where a wrap film composed of a plurality of layers is fabricated, the step involves, though not especially limited, for example, melting resins by extruders for respective layers and coextruding the resins through a multi-layer circular die (for example, ring three-layer die, ring five-layer die).

The lamination step is a step of laminating the extruded resins to thereby fabricate a laminated body when a wrap film composed of a multi-layer is produced. A lamination method is not especially limited, but examples thereof include a dry lamination method, an extrusion lamination method, and a coextrusion method. Among these, the coextrusion method is preferable in the point that its facility is simple.

The stretching step is a step of biaxially stretching the extruded polyolefin resin to thereby orient the polyolefin resin in the MD direction and in the TD direction. A stretching method is not especially limited, but examples thereof include a cast method of taking off a melted polyolefin resin by using a cooling roller, a double bubble inflation method of cooling and solidifying and thereafter heating and stretching a melted resin tube, a direct inflation method of directly blowing air in and stretching a melted resin tube, and a consecutive tenter biaxial stretching method of carrying out roll longitudinal stretching and thereafter carrying out tenter lateral stretching. The wrap film is stretched until the wrap film has a proper thickness. In order to make the cutting property of the wrap film to be good, important factors are particularly the control of the stretch ratios in the MD direction and in the TD direction in the stretching, and the TD tear strength obtained thereby.

In the stretching step, biaxial stretching is preferable; the consecutive tenter biaxial stretching method and the double bubble inflation method are more preferable; and the double bubble inflation method is still more preferable. By carrying out the biaxial stretching, the cutting property is likely to be more improved.

In the stretching procedure in the stretching step, although the simultaneous biaxial stretching in which stretching is carried out simultaneously in the MD direction and in the TD direction can be applied, there is more preferable the consecutive biaxial stretching in which stretching is carried out in the TD direction after stretching is carried out in the MD direction, or the consecutive biaxial stretching in which stretching is carried out in the MD direction after stretching is carried out in the TD direction. By carrying out the consecutive biaxial stretching, the oriented component formation in oblique directions is suppressed, and when the wrap film is cut, the wrap film is not torn in oblique directions, and can be cut in good straightness in the TD direction or in the MD direction.

The stretch ratios in the MD and TD directions are preferably 5.0 to 12 times, more preferably 5.5 to 11 times, and still more preferably 6.0 to 10 times. When the stretch ratios are in the above range, the degree of orientation of the polyolefin-based resin in the wrap film is raised and the wrap film is likely to be provided which is better in the cutting property by hand and in which tearing trouble is more suppressed. The stretch ratio in the TD direction is a ratio of (a film width after the stretching)/(a parison width before the stretching); and the stretch ratio in the MD direction is a ratio of (a line velocity after the stretching)/(a line velocity before the stretching). Further the areal stretch ratio is preferably 5 to 70 times, and more preferably 20 to 60 times. When the areal stretch ratio is 5 times or higher, the cutting property is likely to be better. Further when the areal stretch ratio is 70 times or lower, the dimensional change of products is likely to become smaller.

The stretching temperature is preferably the melting point of the polyolefin-based resin+60° or lower, more preferably the melting point+40° C. or lower, and still more preferably the melting point+30° C. or lower. When the stretching temperature is in the above range, the degree of orientation of the polyolefin-based resin becomes high, and the cutting property by hand is likely to be better.

The winding-up step is a step of winding up the stretched film by a wind-up machine to thereby fabricate a mother roll film. In a slitting step thereafter, both edges of the mother roll film are cut by a slitter to peel the film into two sheets; and the film is further cut into a desired width and wound up to thereby make a roll. Finally in a rewinding step, the film is wound up by a desired winding length from the roll to thereby fabricate a wound film. A winding-up method is not especially limited, but examples thereof include a method of winding-up on a core body. The core body is not especially limited, but examples thereof include paper-made, plastic-made, metal-made and wood-made core bodies and combinations thereof. As another winding-up method, a roll with no core body can be obtained by using no core body and winding up by using an air shaft or the like as a winding core. This is advantageous in generating no refuse of a core body when the roll is discarded after use.

The energy ray irradiation step can be carried out on a parison or a film after being stretched. Electron beams to be used in the electron beam crosslinking treatment process is not especially limited, but examples thereof include ionizing radiations such as ultraviolet rays, electron beams, X rays, α rays, β rays, γ rays and neutron beams. Among these, electron beams are preferable. Examples of an irradiation method using electron beams include a method of irradiating a whole parison or film with electron beams, example, at an energy voltage of 100 kV to 1 MV.

For the purposes of the degradation prevention of the resin and the additives such as an antifogging agent in extrusion and kneading, the regulation of the degree of crosslinking in electron beam crosslinking, and the like, an antioxidant may be added. An addition method thereof is not especially limited, but includes a method of adding it together with a raw material resin directly to an extruder, a method of adding it by using a master batch containing the antioxidant previously kneaded with a raw material resin, and a method of previously adding it in a liquid additive such as an antifogging agent and adding the liquid additive directly to an extruder. The antioxidant, since having an effect of inhibiting the crosslinking reaction in electron beam crosslinking, can regulate the degree of crosslinking by regulation of the addition amount of the antioxidant. In shrink films to be used for shrink packing using automatic packing machines, a larger addition amount of an antioxidant in the surface layer makes the degree of crosslinking of the surface layer to be lower, and the thermal sealability is likely to be raised, which is more preferable. By contrast, in the present wrap film, a smaller addition amount thereof makes the degree of crosslinking to be higher and the cutting property is likely to be improved, which is more preferable. Further as required, there may be carried out post-treatments, for example, heat set for dimensional stability and lamination with another type of film.

As one example of the production method of the wrap film, a double bubble inflation method will be described in more detail.

First, a melted polyolefin-based resin or a melted resin composition containing a polyolefin-based resin is extruded tubularly from a die mouth of a circular die to thereby form a parison, which is a tubular resin composition.

In order to impart a peeling property to the parison inside, a sock solution may be injected. The sock solution is not especially limited, but examples thereof include water, mineral oil, alcohols; polyhydric alcohols such as propylene glycol and glycerol; and cellulose-based or polyvinyl alcohol-based aqueous solutions. The sock solution may be used singly or concurrently in two or more. Further as required, there may be added to the sock solution, a weather resistance improving agent, an antifogging agent, an antibacterial agent and the like used in conventional food packing materials.

Then, the outside of the parison, which is an extrudate, is brought into contact with cold water in a cooling tank, a water-cooling ring or the like, and a sock solution is injected in the interior of the parison by a common method and stored therein to thereby cool and solidify the parison from the inside and outside. At this time, the parison is put in the state that the sock solution is being applied on the inside thereof. The solidified parison is folded by a first pinch roll to thereby form a parison as a double ply sheet. The applying amount of the sock solution is controlled by a pinch pressure of the first pinch roll. In the case of carrying out the energy ray irradiation step, the parison is irradiated with energy rays such as electron beams to thereby crosslinking the resin.

Then, air is injected in the inside of the parison, so that the parison is opened to again become tubular. The parison is again heated up to a temperature suitable for stretching. The temperature suitable for stretching is, from the viewpoint of being capable of easily stretching the parison, preferably 130 to 230° C. Then, in the inflation step, air is injected in the tubular parison heated up to the suitable temperature to form a bubble by inflation stretching to thereby obtain a stretched film.

Thereafter, the stretched film is folded by a third pinch roll to thereby make a double ply film. Thereafter, a heat set step is carried out as required. The double ply film is wound up by a wind-up roll. Further the double ply film is slit and peeled so as to become a sheet of the film (single peeling). Finally, the film is wound up, for example, on a core body to thereby obtain a wrap film roll.

The above description is one example of the production method of the wrap film; and the wrap film may be produced by various types of apparatus constitutions, conditions and the like other than the above; and for example, another known method may be employed.

[Wrap Film-Encasing Body]

A wrap film-encasing body according to the present embodiment has a wound boy of the above polyethylene-based resin wrap film, and a container encasing the roll. The container may or may not have a cutting tool to cut the polyethylene-based resin wrap film.

FIG. 1 shows a perspective view illustrating one example of a wrap film-encasing body encasing a polyolefin-based resin wrap film according to the present embodiment. The container encasing a wrap film F includes an encasing box L composed of: a rectangular parallelepiped encasing room 8 which is formed of the wall surfaces of a front plate 1, a bottom plate 2, a rear plate 3 and side plates 6 and whose upper part is opened; and a lid body 4 which is formed of the wall surfaces of a lid plate 4 connected with and installed from the upper end edge of the rear plate 3 in the direction covering the encasing room 8, a covering lid piece 5 extending from the front end edge of the lid plate 4 in the direction covering the front plate 1, and side covering lid pieces 7 installed on both sides of the covering lid piece 5.

[Roll]

A roll R is one made by winding the above polyethylene-based resin wrap film F.

[Container]

Figure 5:
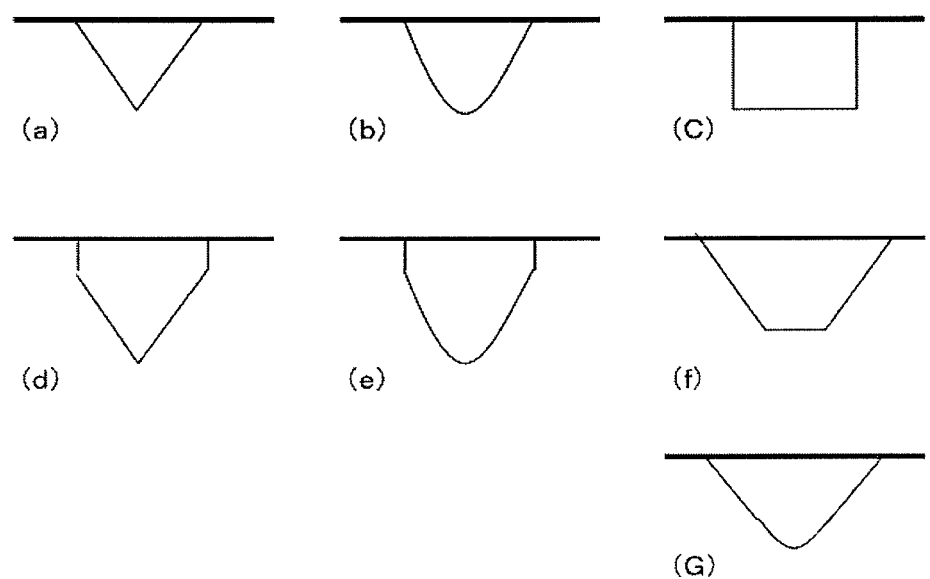
FIG. 5 ((a)-(G)) shows diagrams illustrating examples of shapes of cutting tools for a wrap film container.

A container is one to encase the roll R. The container may have a cutting tool to cut the polyethylene-based resin wrap film. FIG. 5 illustrates examples of cutting tool shapes of the wrap film container. As illustrated in FIG. 5, the cutting tool is not especially limited, but for example, a projection-shape tool provided on a part of the container is preferable. It is especially preferable that a part of a lid part of the container has a projection. Here, the cutting tool refers to one having a shape to impress a force locally on a portion on the polyethylene-based resin wrap film to become a cutting starting point, and does not include a saw blade disposed across the entire width direction of the film. The polyethylene-based resin wrap film according to the present embodiment, since being cut in good straightness in the MD direction or in the TD direction when a force is impressed locally on the polyethylene-based resin wrap film, can be cut more easily if there is a cutting tool such as a projection in place of a blade.

Figure 6:
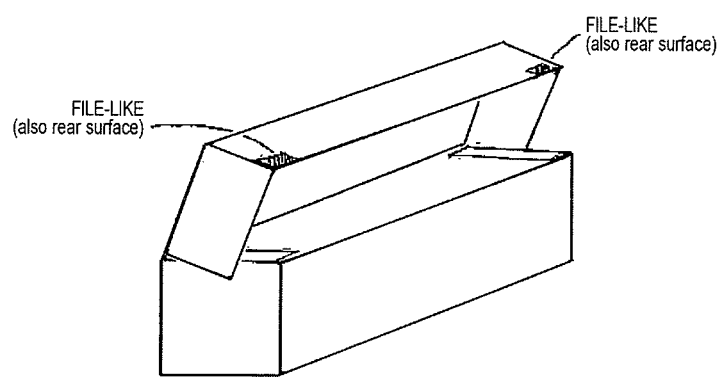
FIG. 6 shows a perspective view illustrating another example of a wrap film-encasing body encasing a polyolefin-based resin wrap film according to the present embodiment.

The installing position of the cutting tool in the case where the container to be used in the present embodiment has the cutting tool such as a projection is not especially limited as long as being a position where the cutting tool can easily cut the wrap film, and the front edge of the covering lid piece 5 is more preferable. The cutting tool is a tool to cut the wrap film, and ones having various shapes and materials can be used. The shape of the cutting tool is not especially limited, but examples thereof include projecting shapes and angular shapes. Among these, angular shapes, which can cut a film more lightly, are preferable. The material of the cutting tool is not especially limited, but examples thereof include: polymeric materials including aliphatic ester-based polymers such as lactic acid-based polymers, and ester-based polymers such as aromatic ester-based polymers, ethylene-based polymers, propylene-based polymers, styrene-based polymers and amide-based polymers; and besides, vulcanized papers, resin-impregnated hard papers, abrasive grains, and abrasive grain-fixed papers. Among these, lactic acid-based polymers, which are recyclable and environment-friendly, are more preferable. Further as the cutting tool having no cutting blade, also a covering lid piece having a file portion is preferable. FIG. 6 illustrates a perspective view of another example of the wrap film-encasing body encasing the polyolefin-based resin wrap film according to the present embodiment. File portions disposed on the covering lid piece illustrated in FIG. 6 make a starting point for cutting by being brought into contact with the polyethylene-based resin wrap film when the polyethylene-based resin wrap film is cut from its end. The wrap film is cut more easily from the cutting starting point in the transverse direction.

Since the polyethylene-based resin wrap film according to the present embodiment can easily be cut by hand, the container may not have a cutting tool to cut the wrap film. For example, it is more preferable that the wrap film is combined with a box in which a roll is taken in and out from a side surface of a container, and when the wrap film is cut by hand, it can be cut only by the roll. Further if the container is one having no blade, injuries by the blade can be prevented to allow safe usage, and since there is no need for separating the blade from the container body and discarding the blade, the container has an advantage for discard thereof.

The material of the container is not especially limited, but examples thereof include plastics, metals, wood, corrugated boards, cardboards and combinations thereof. Among these, cardboards are preferable in the point of their good usability. The cardboard is a thick paper of 0.35 to 1.50 mm in thickness, and a thicker one generally gives a high-rigidity and strength, durable encasing container. However, since it becomes difficult to be folded, the thickness is more preferably 0.35 to 0.80 mm.

EXAMPLES

Hereinafter, the present invention will be described more specifically by way of Examples and Comparative Examples. The present invention is not any more limited to the following Examples.

[Measurement Methods]

[Density]

The density of the polyolefin-based resin was measured according to JIS K7112.

[Melt Flow Rate]

The melt flow rate (hereinafter, referred to also as "MFR") at 190° C. at 2.16 kg of the polyolefin-based resin was measured according to JIS K7210.

[Tear Test in the MD Direction and in the TD Direction]

The tear strengths in the MD direction and the tear strength in the TD direction of the wrap film were measured using an Elmendorf tear strength tester (manufactured by Toyo Seiki Seisaku-sho Ltd.) according to JIS K7128, except for cutting a 10-mm score on the film of 60 mm×60 mm and tearing the film in a direction at 45° to the MD direction.

In the measurement of the tear test in the MD direction and in the TD direction, the acute angle formed by the torn direction and the tearing direction (MD direction or TD direction) was measured.

[Tear Test in an Oblique Direction]

Figure 2:
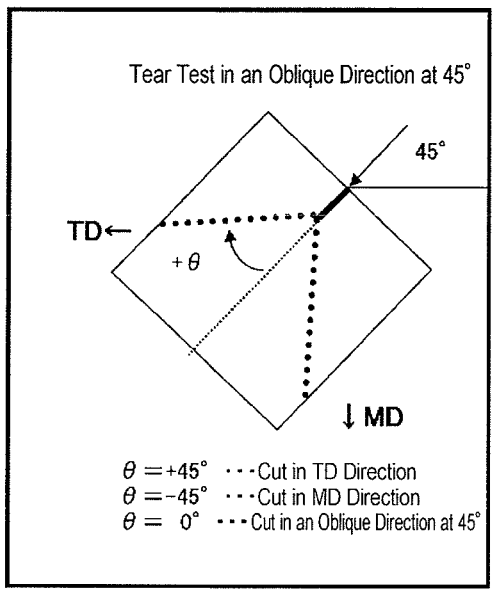
FIG. 2 shows a diagram illustrating an outline of a tear test in Examples.

FIG. 2 illustrates an outline of an oblique tear test (tear test in a direction at 45° to the MD direction) in Examples. The tear strength in a direction at 45° to the MD direction of the wrap film was measured using an Elmendorf tear strength tester (manufactured by Toyo Seiki Seisaku-sho Ltd.) according to JIS K7128, except for cutting a 10-mm score on the film of 60 mm×60 mm and tearing the film in a direction at 45° to the MD direction.

In the measurement of the oblique tear test, the acute angle formed by the torn direction and the tearing direction (a direction at 45° to the MD direction) was measured.

The cutting property evaluation of the oblique tear test was carried out by evaluating the acute angle formed by the torn direction and the tearing direction (a direction at 45° to the MD direction) according to the following evaluation criteria.

The evaluation criteria

⊚: The acute angle formed by the torn direction and the tearing direction was 40° or larger and 50° or smaller, and the tear strength was 2 to 6 g.

○: The acute angle formed by the torn direction and the tearing direction was 30° or larger and smaller than 40°, or larger than 50° and 60° or smaller, and the tear strength was 10 g or lower.

X: The acute angle formed by the torn direction and the tearing direction was larger than 60°, or smaller than 30°, or the tear strength was higher than 10 g.

[Cutting Property with No Blade]

In the no-blade cutting property evaluation, first, a wrap film roll was held by one hand; the wrap film was drawn out from the upside by 30 cm; and the thumb of the hand holding the wrap film roll was pressed on the central part in the transverse direction. Then, the thumb was strongly pressed on the wrap film while a tension was applied in the drawing-out direction to the drawn-out wrap film. A trigger for cutting was fabricated on the wrap film by the pressing of the thumb, and thereafter the wrap film was cut in the transverse direction by the drawing-out-direction tension. The cut situation at this time was evaluated according to the following evaluation criteria.

The Evaluation Criteria

◎: The wrap film was cut straight in the transverse direction in a clean cut surface with a not too large force being applied.

○: The wrap film was cut nearly straight in the transverse direction in a clean cut surface with a slightly large force being applied.

Δ: The wrap film was cut, but the cut line was not straight in the transverse direction and the cut surface was not clean.

X: The wrap film was not well cut in the transverse direction.

[Elastic Modulus]

The elastic modulus in the film machine direction was measured according to ASTMD-882. The measurement conditions were: the tensile rate was 5 ram/min; the initial sample length (gap between chucks) was 100 mm, and the sample width was 10 mm, and the elastic modulus was calculated from a stress at an elongation of 2%. The evaluation criteria were as follows.

The Evaluation Criteria

X: The elastic modulus was higher than 700 MPa, wherein the tension, rigidity and touch feeling were poor.

Δ: The elastic modulus was higher than 600 MPa and 700 MPa or lower, wherein the tension, rigidity and touch feeling had no practical problem.

◎: The elastic modulus was 400 MPa or higher and 600 MPa or lower, which was a best elastic modulus, wherein the tension, rigidity and touch feeling were excellent.

○: The elastic modulus was 300 MPa or higher and lower than 400 MPa, which was a proper elastic modulus.

X: The elastic modulus was lower than 300 MPa, which was an improper elastic modulus.

[Puncture Strength]

According to Japanese Agricultural Standard Section 10, a film was fixed on a wood frame whose inner size was 125 mm×125 mm; a needle whose diameter was 1.0 mm and tip end shape was 0.5 mmR was punctured to the central portion of the film at a rate of 50±5 mm/min; a maximum load until the needle penetrated through the film was measured and the measurement was defined as a puncture strength.

[Puncture Depth]

When a test was carried out as in the above puncture strength measurement, the moving distance of the needle until the needle penetrated was measured, and the measurement was defined as a puncture depth.

[MD-Direction Shrinkage Factor (Smd) and TD-Direction Shrinkage Factor (Std)]

The MD-direction shrinkage factor (Smd) and the TD-direction shrinkage factor (Std) were calculated by the following formulae.

$$\text{Machine-direction shrinkage factor } (Smd) = 100/(100 - \alpha md) \quad (1)$$

$$\text{Transverse-direction shrinkage factor } (Std) = 100/(100 - \alpha td) \quad (2)$$

wherein in the formulae (1) and (2), $\alpha md$ represents a maximum thermal shrinkage (%) in the machine direction; and $\alpha td$ represents a maximum thermal shrinkage (%) in the transverse direction.

[Maximum Thermal Shrinkage]

The measurement of the maximum thermal shrinkage was carried out according to ASTM D-1204 (1984 edition). First, three points of marks were put on a film whose size was 120 mm in length×120 min in width in the film MD direction at intervals of 5 cm. Then, two points of marks were put thereon in the film TD direction of the each point of the three points at intervals of 5 cm. The film was subjected to a heat treatment for 1 min in an oven whose temperature was held at a specified temperature, and thereafter taken out; and the thermal shrinkage was calculated from the lengths between the each point.

The specified temperature referred to a higher temperature out of temperatures of the crystal melting completion temperature+10° C. and the glass transition temperature+30° C. in first heating in which the film was heated at a temperature-rise rate of 10° C./min by DSC method. The thermal shrinkage more increased when the measurement temperature was higher, but reached an equilibrium at a certain temperature or higher. Since it was conceivable that the specified temperature caused fully the glass transition and the crystal melting; the molecular orientation fully relaxed; and a maximum thermal shrinkage developed, the thermal shrinkage at this temperature was defined as a maximum thermal shrinkage.

[Transmission Wide-Angle X-Ray Scattering (WAXS)]

A square sample of 1 cm in length and 1 cm in width was cut out from a wrap film obtained in the below, and was set in a sample holder so that the MD direction (winding-up direction) of the sample became longitudinal and the TD direction (the direction orthogonal to the MD direction) thereof became lateral. The measurement was carried out using an X-ray scattering apparatus (Nano-Viewer), manufactured by Rigaku Corp. The measuring conditions were: the incident X-ray wavelength was 0.154 nm; the camera length was 79.1 mm; the output was 45 kV/60 mA; and the measurement time was 15 min. As a detector, an imaging plate was used. In the above measurement, an air scattering correction was carried out.

A scattering intensity profile was obtained in the range of a scattering angle (2θ) of 20.9° to 21.8° with respect to the azimuth φ. The actually measured data were processed by the above-mentioned method, and there were calculated the average area S' of the four scattering peaks emerging in the azimuth distribution profile and the oriented component ratio R. Here, the calculation formulae were the above formulae (3) to (6).

[Melting Point]

The melting point of a wrap film obtained in the below was measured by carrying out the following six-stage program by using a DSC manufactured by PerkinElmer Inc.

1) Held at 0° C. for 1 min.
2) Heated from 0° C. up to 200° C. at 10° C./min.
3) Held at 200° C. for 1 min.
4) Cooled from 200° C. down to 0° C. at 10° C./min.
5) Held at 0° C. for 1 min.
6) Heated from 0° C. up to 200° C. at 10° C./min.

A calorimetric peak in the 6) in the above stages was defined as a melting point.

[Gel Fraction]

The gel fraction of a wrap film was measured as follows according to ASTM-D2765. A mass fraction of an insoluble content after the wrap film was extracted in boiled paraxylene for 12 hours was represented by the following formula, which was defined as a gel fraction. Here, the sample used was a parison-like one obtained by thermally shrinking a stretched film at 140° C. Here, in the measurement of the gel fraction, there could suitably be used a solvent having a boiling point equal to or higher than the film melting point.

Gel fraction (% by mass)=(a sample weight after the extraction)/(a sample weight before the extraction)×100

[Heat-Resistive Temperature]

The heat-resistive temperature of a wrap film was evaluated as follows according to Wrap Quality Indication Procedure (Tokyo Civil Table No. 29) based on Tokyo Metropolitan Consumption Life Regulation Section 11, and by partially changing the conditions.

A wrap film was cut into 3 cm in width×14 cm in length; pasteboard sheets of 3 cm in width×2.5 cm in length were adhered so as not to come off through a double-sided tape on both surfaces of the upper end and the lower end of the film; and the film was used as a sample piece. No weight was suspended from the lower end of the sample piece, and the upper end thereof was fixed through a jig in an oven held at a predetermined temperature; and the presence/absence of cutting was checked after 1 hour. In the case where the film was cut, the temperature of the oven was lowered by 5° C., and the measurement was carried out similarly. In the case where the film had not been cut, the temperature of the oven was raised by 5° C., and the measurement was carried out similarly. A highest temperature, obtained by this result, at which the sample piece had not been cut was defined as a heat-resistive temperature. The evaluation was carried out in three ranks as follows.

The Evaluation Criteria

○: 140° C. or higher wherein the heat resistance was excellent; and the wrap film was usable enough.

Δ: 100° C. or higher and lower than 140° C. wherein there was no problem with the heat resistance; and the wrap film was usable in microwave ovens.

X: lower than 100° C. wherein the heat resistance was poor; and the wrap film was hardly usable.

[Adhesion Workload (Adhesiveness)]

The adhesion workload of a wrap film is a value for evaluating the adhesiveness of the film with itself when the film is covered on containers such as eating utensils and food. The adhesion workload was measured and evaluated as follows.

Two circular columns having a bottom area of 25 cm$^2$ and a mass of 400 g were prepared. Then, a filter paper having the same area as the bottom surface was previously pasted on the bottom surfaces each. A wrap film was strained and fixed so as not to become wrinkled on the bottom surfaces each of the two circular columns pasted with the filter paper. Then, the two circular columns were joined so that these film surfaces exactly overlapped each other; thereafter immediately, a weight of 500 g was loaded thereon for pressure bonding for 1 min. After the lapse of the predetermined time, the weight was removed; and immediately the overlapped films were pulled apart mutually in the directions perpendicular to the surfaces by a tensile tester at a rate of 5 mm/min; and the energy (mJ) generated at this time was defined as a adhesion workload. The measurement was carried out in a 23° C. atmosphere. The test was carried out 10 times and an average value was employed. The evaluation was carried out in four ranks as follows.

The Evaluation Criteria

X: Being higher than 3.50 mJ wherein there was excessive close-adhesion.

Δ: Being higher than 3.00 mJ and 3.50 mJ or lower wherein there was almost no excessive close-adhesion; and there was no practical problem with the close-adhesion.

○: Being higher than 2.00 mJ and 3.00 mJ or lower wherein there were no spontaneous peeling and no excessive close-adhesion; and the adhesiveness was excellent.

⊚: Being 1.00 mJ or higher and 2.00 mJ or lower, which was a best adhesion workload wherein the adhesiveness was remarkably excellent.

○: Being 0.80 mJ or higher and lower than 1.00 mJ wherein there were no spontaneous peeling and no excessive close-adhesion wherein the adhesiveness was excellent.

Δ: Being 0.50 mJ or higher and lower than 0.80 mJ; there were almost no spontaneous peeling and almost no excessive close-adhesion wherein there was no practical problem with the adhesiveness.

X: Being lower than 0.50 mJ; there was spontaneous peeling wherein there was a practical problem with the adhesiveness.

[Thickness]

The thickness of a wrap film was measured according to ASTME-252. Specifically, the measurement was carried out by using a TECLOCK US-26, manufactured by Techlock Corp.

[Practically Packed Hot Oil Resistance]

The practically packed hot oil resistance to evaluate the practical hot oil resistance when a dish was actually wrap-packed and heated in a microwave oven was measured as follows. Curry and rice was served on a plate, packed from the upside with a wrap film, and heated at 750 W for 1 min with the microwave oven; and thereafter, the presence/absence of breakage, perforation, pinholes and the like on the wrap film was visually checked, and the wrap film was evaluated according to the following evaluation criteria.

The Evaluation Criteria

⊚: No generation of breakage, perforation, pinholes.

○: Generation of only pinholes having an outer diameter of smaller than 5 mm.

X: Generation of perforation, breakage and the like having an outer diameter of 5 mm or larger.

[Resins and Additives Used in Examples and Comparative Examples]

The following resins were used as materials for surface layers, middle layers and an inner layer. Here, the surface layers were layers to make outermost surfaces of a wrap film; the middle layers were layers to contact with the surface layers of the wrap film, and in the case where there was an inner layer, were layers to contact so as to interpose the inner layer; and the inner layer was a layer to contact so as to be interposed between the middle layers of the wrap film.

LL1: an ethylene-1-octene copolymer; the density: 0.926 g/cm$^3$; MFR: 2.0 g/10 min.

LL2: an ethylene-1-hexene copolymer; the density: 0.913 g/cm$^3$; MFR: 2.0 g/10 min.

LL3: an ethylene-1-hexene copolymer; the density: 0.926 g/cm$^3$; MFR: 2.5 g/10 min.

LL4: an ethylene-1-hexene copolymer; the density: 0.916 g/cm$^3$; MFR: 2.3 g/10 min.

LL5: an ethylene-1-hexene copolymer; the density: 0.912 g/cm$^3$; MFR: 1.0 g/10 min.
VL1: an ethylene-1-hexene copolymer; the density: 0.900 g/cm$^3$; MFR: 2.0 g/10 min.
VL2: an ethylene-1-hexene copolymer; the density: 0.905 g/cm$^3$; MFR: 4.0 g/10 min.
ML1: an ethylene-octene copolymer; the density: 0.939 g/cm$^3$; MFR: 2.1 g/10 min.
LD1: high pressure-processed low density polyethylene; the density: 0.921 g/cm$^3$; MFR: 0.4 g/10 min.
LD2: high pressure-processed low density polyethylene; the density: 0.922 g/cm$^3$; MFR: 0.2 g/10 min.
LD3: high pressure-processed low density polyethylene; the density: 0.924 g/cm$^3$; MFR: 3.0 g/10 min.
HD1: high density polyethylene; the density: 0.954 g/cm$^3$; MFR: 1.1 g/10 min.
EL1: an ethylene-1-octene copolymer elastomer; the density: 0.877 g/cm$^3$; MFR: 0.5 g/10 min.
EL2: an ethylene-1-octene copolymer elastomer; the density: 0.868 g/cm$^3$; MFR: 0.5 g/10 min.
EVA1: an ethylene-vinyl acetate copolymer; a vinyl acetate component: 15%; the density: 0.940 g/cm$^3$; MFR: 2.0 g/10 min.
EVA2: an ethylene-vinyl acetate copolymer; a vinyl acetate component: 15%; the density: 0.940 g/cm$^3$; MFR: 1.0 g/10 min.
PP1: a homopolypropylene; the density: 0.900 g/cm$^3$; MFR: 3.3 g/10 min.
PB1: a propylene-butene copolymer; the density: 0.890 g/cm$^3$; MFR: 2.0 g/10 min.
PMP1: a polymethylpentene; the density: 0.834 g/cm$^3$; MFR: 21 g/10 min (260° C.)
Additive 1: a 1:1 mixture of diglycerol oleate and glycerol monooleate.
Additive 2: diglycerol laurate Examples 1 to 15

Wrap films of Examples 1 to 15 were each obtained by: extruding a material obtained by adding 2.0% by mass of a 1:1 mixture (additive 1) of diglycerol oleate and glycerol monooleate or diglycerol laurate (additive 2) to resin compositions indicated in Table 1, as a single-layer, 3-layer or 5-layer mother roll film from a ring die; cooling and solidifying the extrudate with cold water to thereby fabricate a tubular mother roll film of 120 mm in folding width and 500 μm in thickness; leading the film to an electron irradiation apparatus and irradiating the film with an electron beam accelerated at 500 kV to thereby carry out a crosslinking treatment so that the absorbed dose became 80 kGy; leading the crosslinked film to a stretching machine and again heating the resultant; passing the resultant through two pairs of differential nip rolls; injecting air to thereby form a bubble; and stretching the resultant under the stretching conditions indicated in Table 1. Various physical properties are shown in Table 2.

Example 16

A wrap film of Example 16 was obtained as in the above, except for different points from the above in which the resin composition was one described in Table 1; no electron beam crosslinking was carried out; and the consecutive biaxial stretching was carried out by a stretcher. Various physical properties are shown in Table 2.

Example 17

A wrap film of Example 17 was obtained as in Example 2, except for a different point from the above in which the consecutive biaxial stretching by a stretcher was carried out after the electron beam crosslinking treatment. Various physical properties are shown in Table 2.

Comparative Example 1

A wrap film of Comparative Example 1 was obtained as in Example 8, except for that the resin composition of the inner layer was different as indicated in Table 3. Various physical properties are shown in Table 4.

Comparative Example 2

A wrap film of Comparative Example 2 was obtained as in Example 11, except for that the parison thickness and the stretch ratio were different as indicated in Table 3. Various physical properties are shown in Table 4.

Comparative Example 3

A wrap film of Comparative Example 3 was obtained as in Example 12, except for that the resin composition of the inner layer, and the parison thickness and the stretch ratio were different and no electron beam irradiation was carried out, as indicated in Table 3. Various physical properties are shown in Table 4.

Comparative Example 4

A wrap film of Comparative Example 4 was obtained as in Example 13, except for that no electron beam irradiation was carried out; and the parison thickness and the stretch ratio were different, as indicated in Table 3. Various physical properties are shown in Table 4.

Comparative Examples 5 and 6

Wrap films of Comparative Examples 5 and 6 were obtained as in Example 12, except for that the resin compositions of the inner layer and the middle layer, and the parison thickness and the stretch ratio were different and no electron beam irradiation was carried out, as indicated in Table 3. Various physical properties are shown in Table 4.

Comparative Example 7

A commercially available wrap film using polyethylene was used as a wrap film of Comparative Example 7, as indicated in Table 3. Various physical properties are shown in Table 4.

Comparative Example 8

A commercially available wrap film using polypropylene was used as a wrap film of Comparative Example 8, as indicated in Table 3. Various physical properties are shown in Table 4.

Comparative Example 9

A commercially available wrap film using polymethylpentene was used as a wrap film of Comparative Example 9, as indicated in Table 3. Various physical properties are shown in Table 4.

Figure 3:
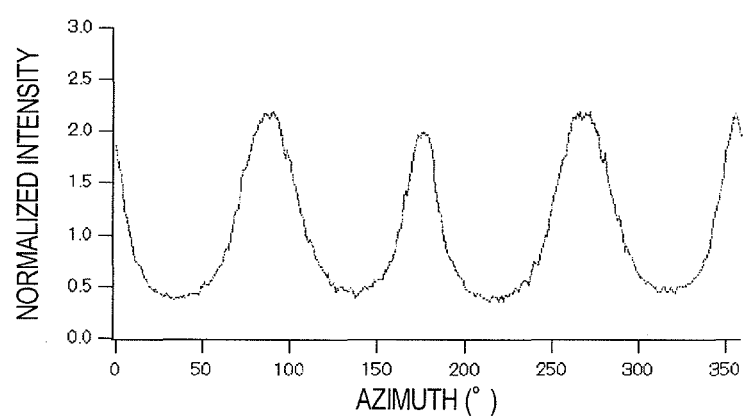
FIG. 3 shows a diagram illustrating an azimuth distribution profile of Example 2.
Figure 4:
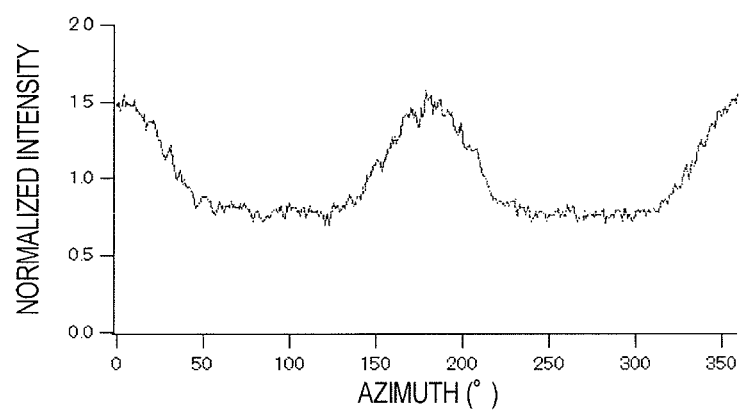
FIG. 4 shows a diagram illustrating an azimuth distribution profile of Comparative Example 2.

Further FIG. 3 shows an azimuth distribution profile of Example 2; and FIG. 4 shows an azimuth distribution profile of Comparative Example 2.

TABLE 1

| Classification | Item | Unit | Example 1 | Example 2 | Example 3 | Example 4 | Example 5 | Example 6 | Example 7 | Example 8 | Example 9 |
|---|---|---|---|---|---|---|---|---|---|---|---|
| Surface Layer | Resin 1 | wt % | LL1:70 | LL1:70 | LL1:70 | LL1:70 | EVA1:100 | LL1:70 | LL2:70 | LL2:90 | VL1:90 |
| | Resin 2 | | LD1:30 | LD1:30 | LD1:30 | LD1:30 | — | LD1:30 | LL3:20 | LD1:10 | LD1:10 |
| | Resin 3 | | — | — | — | — | — | — | LD1:10 | — | — |
| Middle Layer | Resin 1 | wt % | — | — | — | — | — | — | — | — | — |
| | Resin 2 | | — | — | — | — | — | — | — | — | — |
| Inner Layer | Resin 1 | wt % | — | — | — | — | LL1:70 | — | LL4:80 | LL1:70 | VL1:60 |
| | Resin 2 | | — | — | — | — | LD1:30 | — | LD2:20 | LD1:30 | EVA2:40 |
| | Resin 3 | | — | — | — | — | — | — | — | — | — |
| | Additive | — | additive 1 | additive 1 | additive 1 | additive 1 | additive 1 | additive 1 | additive 1 | additive 1 | additive 1 |
| Layer Ratio | (3-layer) surface layer/inner layer/surface layer | % | single-layer | single-layer | single-layer | single-layer | 15/70/15 | single-layer | 15/70/15 | 15/70/15 | 15/70/15 |
| | (5-layer) surface layer/middle layer/inner layer/middle layer/surface layer | | | | | | | | | | |
| Film Production Conditions | Electron Beam Crosslinking | — | present | present | present | present | present | present | present | present | present |
| | Thickness of Parison being a Double Ply Sheet | μm | 400 | 200 | 240 | 200 | 340 | 460 | 440 | 460 | 460 |
| | Stretch ratio MD | times | 8 | 4 | 6 | 6 | 7 | 7 | 8 | 7 | 7 |
| | Stretch ratio TD | | 6 | 6 | 5 | 4 | 6 | 6 | 6 | 6 | 6 |
| | Heating Temperature | °C. | 140 | 140 | 140 | 140 | 140 | 140 | 140 | 140 | 140 |
| | Film Thickness | μm | 8 | 8 | 8 | 8 | 8 | 11 | 9 | 11 | 11 |

| Classification | Item | Unit | Example 10 | Example 11 | Example 12 | Example 13 | Example 14 | Example 15 | Example 16 | Example 17 |
|---|---|---|---|---|---|---|---|---|---|---|
| Surface Layer | Resin 1 | wt % | LL2:90 | LL1:50 | EVA2:100 | LL1:70 | LD3:60 | EVA1:70 | PMP1:100 | LL1:70 |
| | Resin 2 | | LD1:10 | VL2:50 | — | EVA2:30 | LL5:40 | LL1:20 | — | LD1:30 |
| | Resin 3 | | — | — | — | — | — | LD1:10 | — | — |
| Middle Layer | Resin 1 | wt % | — | — | VL2:100 | — | — | — | — | — |
| | Resin 2 | | — | — | — | — | — | — | — | — |
| Inner Layer | Resin 1 | wt % | ML1:80 | LL1:70 | LL1:70 | EVA2:100 | HD1:70 | LL1:70 | — | — |
| | Resin 2 | | LD2:20 | LD1:30 | LD1:20 | — | LD1:30 | LD1:30 | — | — |
| | Resin 3 | | — | — | PP1:10 | — | — | — | — | — |
| | Additive | — | additive 1 | additive 1 | additive 1 | additive 1 | additive 1 | additive 2 | additive 1 | additive 1 |
| Layer Ratio | (3-layer) surface layer/inner layer/surface layer | % | 15/70/15 | 20/60/20 | | 15/70/15 | 15/70/15 | 5/90/5 | single-layer | single-layer |
| | (5-layer) surface layer/middle layer/inner layer/middle layer/surface layer | | | | 5/30/30/30/5 | | | | | |
| Film Production Conditions | Electron Beam Crosslinking | — | present | present | present | present | present | present | absent | present |
| | Thickness of Parison being a Double Ply Sheet | μm | 720 | 460 | 460 | 460 | 360 | 400 | 80 | 200 |
| | Stretch ratio MD | times | 6 | 7 | 7 | 7 | 7 | 8 | 4 | 4 |
| | Stretch ratio TD | | 6 | 6 | 6 | 6 | 5 | 6 | 2 | 6 |
| | Heating Temperature | °C. | 140 | 140 | 140 | 140 | 170 | 140 | 230 | 140 |
| | Film Thickness | μm | 20 | 11 | 11 | 11 | 10 | 8 | 8 | 8 |

TABLE 2

| Classification | Item | | | Unit | Example 1 | Example 2 | Example 3 | Example 4 | Example 5 | Example 6 | Example 7 | Example 8 | Example 9 |
|---|---|---|---|---|---|---|---|---|---|---|---|---|---|
| Film Physical Properties | MD Tear Test | Cut Direction | | degree | 0 | 0 | 0 | 0 | 0 | 0 | 0 | 0 | 0 |
| | | Tear Strength | | g | 2.8 | 2.7 | 2.3 | 1.3 | 1.8 | 3.5 | 1 | 2.6 | 6.1 |
| | TD Tear Test | Cut Direction | | degree | 0 | 0 | 0 | 0 | 0 | 0 | 0 | 0 | 0 |
| | | Tear Strength | | g | 2.7 | 1.2 | 2 | 4.8 | 1.7 | 2.9 | 1.7 | 1.8 | 3.9 |
| | Oblique Tear Test | Cut Direction | | degree | 38 | 41 | 38 | 35 | 40 | 40 | 37 | 39 | 37 |
| | | Tear Strength | | g | 2.7 | 2.5 | 3.4 | 4.8 | 2.4 | 3.8 | 3.1 | 3.1 | 4.8 |
| | | Cutting Property Evaluation | | — | ◎ | ◎ | ◎ | ◎ | ◎ | ◎ | ◎ | ◎ | ◎ |
| | Elastic Modulus | MD | | MPa | 600 | 564 | 664 | 859 | 443 | 454 | 341 | 402 | 161 |
| | | Evaluation | | — | ◎ | ◎ | ◎ | ◎ | ◎ | ◎ | ○ | ◎ | X |
| | | Puncture Strength | | g | 218 | 166 | 161 | 182 | 192 | 238 | 196 | 284 | 306 |
| | | Puncture Depth | | mm | 11.2 | 10.4 | 9.6 | 10.4 | 11.6 | 12.5 | 12.1 | 13.2 | 17.3 |
| | | Puncture Depth/Thickness | | — | 1400 | 1300 | 1200 | 1300 | 1450 | 1136 | 1344 | 1200 | 1573 |
| | | Melting Point | | °C. | 118 | 118 | 118 | 118 | 120 | 118 | 107 | 115 | 93 |

TABLE 2-continued

| Classification | | Item | | Unit | | | | | | | | | |
|---|---|---|---|---|---|---|---|---|---|---|---|---|---|
| | Maximum Shrinkage Percentage | MD | | % | 83 | 78 | 82 | 84 | 78 | 82 | 82 | 81 | 84 |
| | | TD | | % | 80 | 80 | 74 | 71 | 84 | 81 | 79 | 79 | 82 |
| | Shrinkage Factor | MD (Smd) | | times | 5.7 | 4.5 | 5.6 | 6.3 | 4.5 | 5.6 | 5.6 | 5.2 | 6.1 |
| | | TD (Std) | | times | 5.0 | 5.0 | 3.8 | 3.4 | 6.3 | 5.3 | 4.8 | 4.8 | 5.6 |
| | | Smd × Std | | times | 29 | 23 | 21 | 22 | 28 | 29 | 26 | 25 | 34 |
| | | Std/Smd | | — | 0.9 | 1.1 | 0.7 | 0.6 | 1.4 | 0.9 | 0.9 | 0.9 | 0.9 |
| | Gel Fraction | | | % | 33 | 33 | 33 | 33 | 33 | 25 | 22 | 28 | 18 |
| | Heat-Resistive Temperature | Temperature | | °C. | 165 | 165 | 165 | 165 | 180 | 165 | 165 | 165 | 160 |
| | | Evaluation | | — | ○ | ○ | ○ | ○ | ○ | ○ | ○ | ○ | ○ |
| Orientation Analysis | WAXS | The Number of Peaks | | the number | 4 | 4 | — | 4 | 4 | — | — | — | — |
| | | Distance between Peaks | | ° | 92, 88, 89, 91 | 87, 88, 90, 95 | — | 90, 86, 94, 90 | 91, 86, 94, 89 | — | — | — | — |
| | | Oriented Component Ratio R | | — | 0.91 | 1.77 | — | 0.26 | 1.05 | — | — | — | — |
| | | Peak Area S' | | — | 42 | 54 | — | 55 | 32 | — | — | — | — |
| Wrap Performance Evaluation | No-Blade Cutting Property | | | — | ◎ | ◎ | ◎ | ◎ | ◎ | ◎ | ○ | ○ | ○ |
| | Practically Packed Hot Oil Resistance | | | — | ○ | ○ | ○ | ○ | ○ | ○ | ○ | ○ | ○ |
| | Close-Adhesion Work | Work | | mJ | 1.0 | 1.1 | 0.9 | 1.0 | 1.1 | 1.0 | 1.1 | 1.0 | 1.2 |
| | | Evaluation | | — | ◎ | ◎ | ○ | ◎ | ◎ | ◎ | ◎ | ◎ | ◎ |
| Comprehensive Evaluation | | | | — | ◎ | ◎ | ◎ | ◎ | ◎ | ◎ | ○ | ○ | ○ |

| Classification | | Item | | Unit | Example 10 | Example 11 | Example 12 | Example 13 | Example 14 | Example 15 | Example 16 | Example 17 |
|---|---|---|---|---|---|---|---|---|---|---|---|---|
| | Film Physical Properties | MD Tear Test | Cut Direction | degree | 3.7 | 0 | 0 | 0 | 2.7 | 0 | — | 0 |
| | | | Tear Strength | g | 8.3 | 4.2 | 10.8 | 5.6 | 3 | 1.2 | 100< | 1.1 |
| | | TD Tear Test | Cut Direction | degree | 0 | 0 | 0 | 0 | 0 | 0 | 0 | 0 |
| | | | Tear Strength | g | 5.9 | 6.1 | 7 | 14.2 | 2.4 | 1 | 3.2 | 1 |
| | | Oblique Tear Test | Cut Direction | degree | 36 | 40 | 35 | 34 | 39 | 38 | 44 | 43 |
| | | | Tear Strength | g | 7.2 | 3.5 | 5.5 | 7.1 | 2.6 | 2.9 | 8.1 | 2.3 |
| | | | Cutting Property Evaluation | — | ◎ | ◎ | ◎ | ◎ | ◎ | ◎ | ◎ | ◎ |
| | | Elastic Modulus | MD | MPa | 532 | 270 | 180 | 150 | 600 | 678 | 302 | 593 |
| | | | Evaluation | — | ◎ | X | X | X | ◎ | ◎ | ○ | ◎ |
| | | Puncture Strength | | g | 379 | 215 | 320 | 350 | 202 | 200 | 52 | 160 |
| | | Puncture Depth | | mm | 9.9 | 9.4 | 10.1 | 11.3 | 8.3 | 11.2 | 6.5 | 10.2 |
| | | Puncture Depth/Thickness | | — | 495 | 855 | 918 | 1027 | 830 | 1400 | 813 | 1275 |
| | | Melting Point | | °C. | 122 | 123 | 157 | 120 | 128 | 120 | 225 | 118 |
| | Maximum Shrinkage Percentage | MD | | % | 78 | 82 | 80 | 84 | 81 | 82 | 72 | 79 |
| | | TD | | % | 81 | 78 | 80 | 73 | 78 | 80 | 74 | 80 |
| | Shrinkage Factor | MD (Smd) | | times | 4.5 | 5.6 | 5.0 | 6.3 | 5.3 | 5.6 | 3.6 | 3.6 |
| | | TD (Std) | | times | 5.3 | 4.4 | 5.0 | 3.6 | 4.5 | 5.0 | 3.8 | 3.8 |
| | | Smd × Std | | times | 24 | 25 | 25 | 23 | 24 | 28 | 14 | 14 |
| | | Std/Smd | | — | 1.2 | 0.8 | 1.0 | 0.6 | 0.9 | 0.9 | 1.1 | 1.1 |
| | Gel Fraction | | | % | 19 | 30 | — | 30 | 34 | 33 | — | 33 |
| | Heat-Resistive Temperature | Temperature | | °C. | 165 | 165 | 165 | 165 | 165 | 165 | 180 | 165 |
| | | Evaluation | | — | ○ | ○ | ○ | ○ | ○ | ○ | ○ | ○ |
| Orientation Analysis | WAXS | The Number of Peaks | | the number | — | — | — | — | — | — | — | — |
| | | Distance between Peaks | | ° | — | — | — | — | — | — | — | — |
| | | Oriented Component Ratio R | | — | — | — | — | — | — | — | — | — |
| | | Peak Area S' | | — | — | — | — | — | — | — | — | — |
| Wrap Performance Evaluation | No-Blade Cutting Property | | | — | ○ | ○ | ○ | ○ | ◎ | ◎ | ○ | ◎ |
| | Practically Packed Hot Oil Resistance | | | — | ○ | ○ | ○ | ○ | ○ | ○ | ○ | ○ |
| | Close-Adhesion Work | Work | | mJ | 1.0 | 1.0 | 1.2 | 1.4 | 1.3 | 1.1 | 1.0 | 1.1 |
| | | Evaluation | | — | ◎ | ◎ | ◎ | ◎ | ◎ | ◎ | ○ | ◎ |
| Comprehensive Evaluation | | | | — | ○ | ○ | ○ | ○ | ○ | ◎ | ○ | ◎ |

TABLE 3

| Classification | Item | | Unit | Comparative Example 1 | Comparative Example 2 | Comparative Example 3 | Comparative Example 4 | Comparative Example 5 |
|---|---|---|---|---|---|---|---|---|
| Surface Layer | Resin 1 | | wt % | LL2:90 | LL1:50 | EVA2:100 | LL1:70 | EVA1:100 |
| | Resin 2 | | | LD1:10 | VL2:50 | — | EVA2:30 | — |
| | Resin 3 | | | — | — | — | — | — |
| Middle Layer | Resin 1 | | wt % | — | — | VL2:100 | — | EVA2:50 |
| | Resin 2 | | | — | — | — | — | VL2:50 |
| Inner Layer | Resin 1 | | wt % | LL1:70 | LL1:70 | PP1:70 | EVA2:100 | PP1:70 |
| | Resin 2 | | | EL1:30 | LD1:30 | PB1:30 | — | PB1:30 |
| | Resin 3 | | | — | — | — | — | — |
| | Additive | | — | additive 1 | additive 1 | additive 1 | additive 1 | additive 1 |
| Layer Ratio | (3-layer) surface layer/ inner layer/surface layer (5-layer) surface layer/ middle layer/inner layer/ middle layer/surface layer | | % | 15/70/15 | 20/60/20 | 5/30/30/ 30/5 | 15/70/15 | 10/25/30/ 25/10 |
| Film Production Conditions | Electron Beam Crosslinking | | — | present | present | absent | absent | absent |
| | Thickness of Parison being a Double Ply Sheet | | μm | 460 | 340 | 180 | 180 | 180 |
| | Stretch ratio | MD | times | 7 | 6 | 4 | 4 | 4 |
| | | TD | | 6 | 5 | 4 | 4 | 4 |
| | Heating Temperature | | °C. | 140 | 140 | 110 | 110 | 60 |
| | Film Thickness | | μm | 11 | 11 | 11 | 11 | 11 |

| Classification | Item | | Unit | Comparative Example 6 | Comparative Example 7 | Comparative Example 8 | Comparative Example 9 |
|---|---|---|---|---|---|---|---|
| Surface Layer | Resin 1 | | wt % | EVA1:100 | PE commercially available product | PP commercially available product | PMP commercially available product |
| | Resin 2 | | | — | | | |
| | Resin 3 | | | — | | | |
| Middle Layer | Resin 1 | | wt % | EVA2:70 | | | |
| | Resin 2 | | | EL2:30 | | | |
| Inner Layer | Resin 1 | | wt % | PP1:70 | | | |
| | Resin 2 | | | PB1:30 | | | |
| | Resin 3 | | | — | | | |
| | Additive | | — | additive 1 | | | |
| Layer Ratio | (3-layer) surface layer/ inner layer/surface layer (5-layer) surface layer/ middle layer/inner layer/ middle layer/surface layer | | % | 10/25/30/ 25/10 | — | — | — |
| Film Production Conditions | Electron Beam Crosslinking | | — | absent | absent | absent | absent |
| | Thickness of Parison being a Double Ply Sheet | | μm | 180 | — | — | — |
| | Stretch ratio | MD | times | 4 | — | — | — |
| | | TD | | 4 | — | — | — |
| | Heating Temperature | | °C. | 60 | — | — | — |
| | Film Thickness | | μm | 11 | 12 | 11 | 10 |

TABLE 4

| Classification | Item | | Unit | Comparative Example 1 | Comparative Example 2 | Comparative Example 3 | Comparative Example 4 | Comparative Example 5 |
|---|---|---|---|---|---|---|---|---|
| Film Physical Properties | MD Tear Test | Cut Direction | degree | 5.3 | 4.3 | 0 | 0 | 21.7 |
| | | Tear Strength | g | 2 | 4.7 | 12.3 | 6 | 19.8 |
| | TD Tear Test | Cut Direction | degree | 6.7 | 6.7 | 0 | 6.7 | 4.3 |
| | | Tear Strength | g | 2.8 | 6.8 | 8 | 17.5 | 7.2 |
| | Oblique Tear Test | Cut Direction | degree | 23 | 11 | 24 | 20 | 17 |
| | | Tear Strength | g | 5.75 | 7.75 | 18.75 | 13.75 | 11.5 |
| | | Cutting Property Evaluation | — | X | X | X | X | X |
| | Elastic Modulus | MD | MPa | 161 | 269 | 282 | 229 | 281 |
| | | Evaluation | — | X | X | X | X | X |
| | Puncture Strength | | g | 290 | 279 | 233 | 318 | 293 |
| | Puncture Depth | | mm | 15.6 | 10.3 | 10.9 | 12.5 | 16.8 |
| | Puncture Depth/ Thickness | | — | 1418 | 936 | 991 | 1136 | 1527 |
| | Melting Point | | °C. | 118 | 123 | 157 | 120 | 163 |

TABLE 4-continued

| Classification | | Item | | Unit | | | | | |
|---|---|---|---|---|---|---|---|---|---|
| | Maximum Shrinkage Percentage | MD | | % | 83 | 82 | 54 | 84 | 48 |
| | | TD | | % | 79 | 78 | 55 | 73 | 38 |
| | Shrinkage Factor | MD (Smd) | | times | 5.9 | 5.6 | 2.2 | 6.3 | 1.9 |
| | | TD (Std) | | times | 4.8 | 4.4 | 2.2 | 3.6 | 1.6 |
| | | Smd × Std | | times | 28 | 25 | 5 | 23 | 3 |
| | | Std/Smd | | — | 0.8 | 0.8 | 1.0 | 0.6 | 0.8 |
| | Gel Fraction | | | % | 30 | 19 | — | 7 | — |
| | Heat-Resistant Temperature | Temperature | | ° C. | 185< | 175 | 155 | 140 | 160 |
| | | Evaluation | | — | ○ | ○ | ○ | ○ | ○ |
| Orientation Analysis | WAXS | The Number of Peaks | | the number | — | 2 | — | 2 | — |
| | | Distance between Peaks | | ° | — | 180, 180 | — | 181, 179 | — |
| | | Oriented Component Ratio R | | — | — | N/A | — | N/A | — |
| | | Peak Area S' | | — | — | 41 | — | 36 | — |
| Wrap Performance Evaluation | No-Blade Cutting Property | | | — | Δ | Δ | Δ | Δ | X |
| | Practically Packed Hot Oil Resistance | | | — | ○ | ○ | X | X | X |
| | Adhesion workload | Work | | mJ | 0.9 | 0.9 | 1.2 | 1.4 | 1.1 |
| | | Evaluation | | — | ○ | ○ | ◎ | ◎ | ◎ |
| | Comprehensive Evaluation | | | — | X | X | X | X | X |

| Classification | | Item | | Unit | Comparative Example 6 | Comparative Example 7 | Comparative Example 8 | Comparative Example 9 |
|---|---|---|---|---|---|---|---|---|
| Film Physical Properties | MD Tear Test | Cut Direction | | degree | 19.7 | 18.7 | 0 | — |
| | | Tear Strength | | g | 16.2 | 58 | 3 | — |
| | TD Tear Test | Cut Direction | | degree | 2 | — | — | 0 |
| | | Tear Strength | | g | 8 | — | — | 3.8 |
| | Oblique Tear Test | Cut Direction | | degree | 16 | not torn | 41 | 43 |
| | | Tear Strength | | g | 9.05 | X | 12.9 | 12.5 |
| | | Cutting Property Evaluation | | — | X | X | X | X |
| | Elastic Modulus | MD | | MPa | 398 | 231 | 396 | 309 |
| | | Evaluation | | — | ○ | X | ○ | ○ |
| | Puncture Strength | | | g | 298 | 61 | 79 | 64 |
| | Puncture Depth | | | mm | 15.8 | 6.7 | 7.5 | 7.1 |
| | Puncture Depth/Thickness | | | — | 1436 | 558 | 682 | 710 |
| | Melting Point | | | ° C. | 163 | 105 | 162 | 225 |
| | Maximum Shrinkage Percentage | MD | | % | 45 | 1 | 24 | 5 |
| | | TD | | % | 27 | 1 | 18 | 0 |
| | Shrinkage Factor | MD (Smd) | | times | 1.8 | 1.0 | 1.3 | 1.1 |
| | | TD (Std) | | times | 1.4 | 1.0 | 1.2 | 1.0 |
| | | Smd × Std | | times | 2 | 1 | 2 | 1 |
| | | Std/Smd | | — | 0.8 | 1.0 | 0.9 | 1.0 |
| | Gel Fraction | | | % | — | 0 | — | — |
| | Heat-Resistant Temperature | Temperature | | ° C. | 160 | 105 | 160 | 180 |
| | | Evaluation | | — | ○ | Δ | ○ | ○ |
| Orientation Analysis | WAXS | The Number of Peaks | | the number | — | 2 | — | 2 |
| | | Distance between Peaks | | ° | — | 185, 175 | — | 178, 182 |
| | | Oriented Component Ratio R | | — | — | N/A | — | N/A |
| | | Peak Area S' | | — | — | 26 | — | 34 |
| Wrap Performance Evaluation | No-Blade Cutting Property | | | — | X | X | X | Δ |
| | Practically Packed Hot Oil Resistance | | | — | X | X | ○ | ○ |
| | Adhesion workload | Work | | mJ | 1.4 | 1.1 | 0.8 | 1.0 |
| | | Evaluation | | — | ◎ | ○ | ○ | ○ |
| | Comprehensive Evaluation | | | — | X | X | X | X |

Comprehensive Evaluation

⊚: The heat resistance and the adhesiveness were good and the cutting property was remarkably excellent wherein the no-blade cutting property: ⊚; the practically packed hot oil resistance: ○ or higher; and the adhesion workload: ○ or higher.

○: The heat resistance, the adhesiveness and the no-blade cutting property were good wherein the no-blade cutting property: ○; the practically packed hot oil resistance: ○ or higher; and the adhesion workload: ○ or higher.

Δ: The no-blade cutting property was slightly inferior wherein the no-blade cutting property: Δ; the practically packed hot oil resistance: ○ or higher; and the adhesion workload: Δ or higher.

X: The no-blade cutting property was inferior wherein the no-blade cutting property: X; the practically packed hot oil resistance: ○ or higher; and the adhesion workload: Δ or higher.

The present application is based on Japanese Patent Application (Japanese Patent Application No. 2013-259453) filed with Japan Patent Office, on Dec. 16, 2013, the entire contents of which are hereby incorporated by reference.

INDUSTRIAL APPLICABILITY

The polyolefin-based resin wrap film according to the present invention is broadly and effectively applicable as applications for food packing, cooking and the like.

REFERENCE SIGNS LIST

1 FRONT PLATE,
2 BOTTOM PLATE,
3 REAR PLATE,
4 LID PLATE,
5 COVERING LID PIECE,
6 SIDE PLATE,
7 SIDE COVERING LID PLATE,
8 ENCASING ROOM,
R ROLL, and
F WRAP FILM

The invention claimed is:

1. A polyolefin-based resin wrap film comprising a polyethylene-based resin,
wherein the wrap film is torn in a machine direction when being torn in the machine direction;
the wrap film is torn in a transverse direction when being torn in the transverse direction;
the wrap film is torn either in the machine direction or in the transverse direction when being torn in a direction at 45° to the machine direction;
an acute angle formed by a tearing direction and a cut line when the wrap film is torn in a direction at 45° to the machine direction is 30 to 60°;
a tear strength when the wrap film is torn in a direction at 45° to the machine direction is 10 g or lower; and
a machine-direction shrinkage factor (Smd) determined by the following formula (1) and a transverse-direction shrinkage factor (Std) determined by the following formula (2) satisfy Smd≥2.5, Std≥2.5, Smd×Std≥10, and Std/Smd=0.5 to 10:

$$\text{machine-direction shrinkage factor } (Smd) = 100/(100 - \alpha md) \quad (1); \text{ and}$$

$$\text{transverse-direction shrinkage factor } (Std) = 100/(100 - \alpha td) \quad (2),$$

wherein in the above formulae (1) and (2), $\alpha md$ represents a maximum thermal shrinkage (%) in the machine direction; and $\alpha td$ represents a maximum thermal shrinkage (%) in the transverse direction.

2. The polyolefin-based resin wrap film according to claim 1,
wherein an elastic modulus thereof in the machine direction is 300 MPa or higher; and
a puncture strength thereof is 260 g or lower.

3. The polyolefin-based resin wrap film according to claim 1, wherein in an azimuth distribution profile of a scattering intensity at a scattering angle of 2θ=20.9° to 21.8° when an X-ray beam of 0.154 nm in wavelength is allowed to be incident on the film from a film normal direction and transmission wide-angle X-ray scattering is measured,
the azimuth distribution profile has four scattering peaks;
adjacent scattering peak intervals of the four scattering peaks are 90°±10°;
an oriented component ratio R is 0.01 or higher and 100 or lower; and
an average area of the four scattering peaks is 1 or larger and 89 or smaller.

4. The polyolefin-based resin wrap film according to claim 1, wherein a melting point thereof in differential scanning calorimetry is 80 to 123° C.

5. The polyolefin-based resin wrap film according to claim 1, wherein a gel fraction thereof is 10 to 60% by mass.

6. The polyolefin-based resin wrap film according to claim 1, wherein a heat-resistive temperature thereof is 130° C. or higher.

7. A roll obtained by winding a polyolefin-based resin wrap film according to any one of claims 1, 2, and 3 to 6.

8. A wrap film-encasing body, having a roll obtained by winding a polyethylene-based resin wrap film according to claim 7, and a container encasing the roll,
wherein the container has a cutting tool to cut the polyethylene-based resin wrap film.

9. The wrap film-encasing body according to claim 8, wherein the cutting tool is a projection-like tool provided on a part of the container.

10. A wrap film-encasing body, having a roll obtained by winding a polyethylene-based resin wrap film according to claim 7, and a container encasing the roll,
wherein the container has no cutting tool to cut the polyethylene-based resin wrap film.

11. A resin wrap film comprising polyethylene-based resin, wherein the resin wrap film:
a) when torn in the machine direction to form a cut line, the cut line has an acute angle of from 0° to 15° from the machine direction;
b) when torn in the transverse direction to form a cut line, the cut line has an acute angle of from 0° to 15° from the transverse direction;
c) when torn in a direction at 45° from the machine direction to form a cut line, the cut line has an acute angle of from 30° to 60° from the direction of tearing at 45° from the machine direction;
d) has a tear strength when the wrap film is torn in a direction at 45° to the machine direction is 10 g or lower;
e) has a machine-direction shrinkage factor (Smd) greater than or equal to 2.5 wherein the Smd is calculated from the percent maximum thermal shrinkage in the machine direction ($\alpha md$) from the following formula: Smd=100/(100−$\alpha md$);
f) has a transverse-direction shrinkage factor (Std) greater than or equal to 2.5 wherein the Std is calculated from the percent maximal thermal shrinkage in the transverse direction (αtd) from the following formula:
Std=100/(100−αtd);
g) the Smd multiplied by the Std is greater than or equal to 10; and
h) the Std divided by the Smd is from 0.5 to 10.

12. The resin wrap film according to claim 11, wherein an elastic modulus thereof
in the machine direction is 300 MPa or higher; and
a puncture strength thereof is 260 g or lower.

13. The resin wrap film according to claim 11, wherein in an azimuth distribution profile of a scattering intensity at a scattering angle of 2θ=20.9° to 21.8° when an X-ray beam of 0.154 nm in wavelength is allowed to be incident on the film from a film normal direction and transmission wide-angle X-ray scattering is measured,
the azimuth distribution profile has four scattering peaks;
adjacent scattering peak intervals of the four scattering peaks are 90°±10°;
an oriented component ratio R is 0.01 or higher and 100 or lower; and
an average area of the four scattering peaks is 1 or larger and 89 or smaller.

14. The resin wrap film according to claim 11, wherein a melting point thereof in differential scanning calorimetry is 80 to 123° C.

15. The resin wrap film according to claim 11, wherein a gel fraction thereof is 10 to 60% by mass.

16. The resin wrap film according to claim 11, wherein a heat-resistive temperature thereof is 130° C. or higher.

17. A roll obtained by winding a resin wrap film according to claim 11.

18. A wrap film-encasing body, having a roll obtained by winding a polyethylene-based resin wrap film according to claim 17, and a container encasing the roll,
wherein the container has a cutting tool to cut the polyethylene-based resin wrap film.

19. The wrap film-encasing body according to claim 18, wherein the cutting tool is a projection-like tool provided on a part of the container.

20. A wrap film-encasing body, having a roll obtained by winding a polyethylene-based resin wrap film according to claim 17, and a container encasing the roll,
wherein the container has no cutting tool to cut the polyethylene-based resin wrap film.

* * * * *